United States Patent
Lin

(10) Patent No.: US 11,677,686 B2
(45) Date of Patent: Jun. 13, 2023

(54) PACKET FORWARDING METHOD, APPARATUS, DEVICE, AND SYSTEM

(71) Applicant: Alibaba Group Holding Limited, Grand Cayman (KY)

(72) Inventor: Ke Lin, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 196 days.

(21) Appl. No.: 17/200,558

(22) Filed: Mar. 12, 2021

(65) Prior Publication Data

US 2021/0203619 A1   Jul. 1, 2021

Related U.S. Application Data

(63) Continuation of application No. PCT/CN2019/105318, filed on Sep. 11, 2019.

(30) Foreign Application Priority Data

Sep. 18, 2018   (CN) .......................... 201811089427.8

(51) Int. Cl.
*H04L 12/947*       (2013.01)
*H04L 49/25*        (2022.01)
(Continued)

(52) U.S. Cl.
CPC .......... *H04L 49/252* (2013.01); *H04L 49/109* (2013.01); *H04L 49/3009* (2013.01); *H04L 49/557* (2013.01)

(58) Field of Classification Search
CPC . H04L 49/252; H04L 49/109; H04L 49/3009; H04L 49/557; H04L 61/00;
(Continued)

(56) References Cited

U.S. PATENT DOCUMENTS 7,934,020 B1   4/2011   Xu
8,589,919 B2   11/2013  Smith et al.
(Continued)

FOREIGN PATENT DOCUMENTS

CN   102084340 A   6/2011
CN   104348694 A   2/2015
(Continued)

OTHER PUBLICATIONS

Translation of International Search Report dated Nov. 26, 2019, from corresponding PCT Application No. PCT/CN2019/105318, 2 pages.
(Continued)

*Primary Examiner* — Wutchung Chu
(74) *Attorney, Agent, or Firm* — Lee & Hayes, P.C.

(57) ABSTRACT

Packet forwarding methods, apparatuses, devices, and systems are disclosed. An example packet forwarding system includes a target virtual machine, a virtual switch and a network card device, wherein: the target virtual machine is configured to send a first packet to the virtual switch; the virtual switch is configured to add input port information to the first packet to obtain a second packet after receiving the first packet sent by the target virtual machine, and forward the second packet to the network card device; and the network card device is configured to determine a corresponding first forwarding rule based on the input port information included in the second packet in response to receiving the second packet sent by the virtual switch, and perform forwarding processing on the second packet based on the first forwarding rule.

17 Claims, 15 Drawing Sheets

(51) Int. Cl.
*H04L 49/109* (2022.01)
*H04L 49/00* (2022.01)
*H04L 49/55* (2022.01)

(58) Field of Classification Search
CPC ....... H04L 45/566; H04L 49/70; H04L 12/46; H04L 45/74; H04L 61/103
See application file for complete search history.

(56) References Cited

U.S. PATENT DOCUMENTS

| | | | |
|---|---|---|---|
| 8,761,187 | B2 | 6/2014 | Barde |
| 9,081,603 | B2 | 7/2015 | Zhang et al. |
| 9,215,175 | B2 | 12/2015 | Takashima et al. |
| 9,471,356 | B2 | 10/2016 | Ghanwani et al. |
| 9,531,643 | B2 | 12/2016 | Cheng et al. |
| 9,755,853 | B2 | 9/2017 | Berman |
| 9,996,371 | B2 | 6/2018 | Lin et al. |
| 10,129,186 | B2 | 11/2018 | Rajan et al. |
| 10,263,889 | B2 | 4/2019 | Zuo |
| 10,582,420 | B2 | 3/2020 | Kamble et al. |
| 11,301,407 | B2 * | 4/2022 | Sen .................. G06F 3/061 |
| 2011/0261723 | A1 * | 10/2011 | Yamato ............. H04L 45/66 370/255 |
| 2013/0318255 | A1 | 11/2013 | Karino |
| 2015/0334045 | A1 * | 11/2015 | Tremblay ........... H04L 47/783 709/226 |
| 2016/0197824 | A1 | 7/2016 | Lin et al. |
| 2017/0324665 | A1 * | 11/2017 | Johnsen ............. H04L 47/32 |
| 2019/0280980 | A1 * | 9/2019 | Hyoudou ........... H04L 47/125 |
| 2019/0319896 | A1 * | 10/2019 | Guo ................... H04L 49/252 |

FOREIGN PATENT DOCUMENTS

| | | | | |
|---|---|---|---|---|
| CN | 104468462 | A | | 3/2015 |
| CN | 104486234 | A | | 4/2015 |
| CN | 105207873 | A | | 12/2015 |
| CN | 105245456 | A | * | 1/2016 ............. H04L 45/74 |
| CN | 105245456 | A | | 1/2016 |
| CN | 106572047 | A | | 4/2017 |
| CN | 107005495 | A | | 8/2017 |
| CN | 107483369 | A | | 12/2017 |
| CN | 107992352 | A | | 5/2018 |
| CN | 107995129 | A | | 5/2018 |
| CN | 108092923 | A | | 5/2018 |
| CN | 108173696 | A | | 6/2018 |
| WO | WO2014015697 | A1 | | 1/2014 |
| WO | WO2018023498 | A1 | | 2/2018 |
| WO | WO2018023499 | A1 | | 2/2018 |

OTHER PUBLICATIONS

Translation of Written Opinion dated Nov. 26, 2019, from corresponding PCT Application No. PCT/CN2019/105318, 3 pages.
Translation of CN 1st Office Action for corresponding CN Application No. 201811089427.8 dated Jun. 2, 2021,9 pages.
Translation of CN 1st Search Report for corresponding CN Application No. 201811089427.8 dated May 24, 2021, 2 pages.
Translation of CN 2nd Office Action for corresponding CN Application No. 201811089427.8 dated Dec. 20, 2021, 10 pages.
Translation of CN Supplementary Search Report for corresponding CN Application No. 201811089427.8 dated Jun. 16, 2022,2 pages.

* cited by examiner

PACKET FORWARDING METHOD, APPARATUS, DEVICE, AND SYSTEM

CROSS REFERENCE TO RELATED PATENT APPLICATIONS

This application claims priority to and is a continuation of PCT Patent Application No. PCT/CN2019/105318 filed on 11 Sep. 2019, and is related to and claims priority to Chinese Application No. 201811089427.8, filed on 18 Sep. 2018 and entitled "Packet Forwarding Method, Apparatus, Device, and System," which are hereby incorporated by reference in their entirety.

TECHNICAL FIELD

The present disclosure relates to the field of computer technologies, and particularly to packet forwarding methods, apparatuses, devices, and systems.

BACKGROUND

In order to realize data forwarding of a virtual switch (Vswitch), a variety of methods can be implemented. For example, a virtual switch can perform data forwarding through related applications. Alternatively, data forwarding can be performed through other forwarding methods of the virtual switch, or other forwarding components other than the virtual switch.

Generally, in order to realize high-performance forwarding of a virtual switch (Vswitch), the industry generally begins to move the forwarding logic of the virtual switch to a network card device for performing hardware acceleration (Offload), and realize high-performance forwarding through programmable resources of the network card device. Specifically, based on a SR-IOV (Single-Root Input/Output Virtualization) mechanism, a network card device in such a scenario can be directly connected to an internal part of a container, and a VF (Visual FoxPro) instance can be virtualized from the network card device and directly provided to a virtual machine for use to complete a forwarding of data.

However, under the SR-IOV mechanism, for network card devices of different manufacturers, corresponding drivers of the network card devices need to be installed on a virtual machine. However, drivers of many network card devices are not integrated into a Linux Kernel. The corresponding drivers need to be additionally installed inside the virtual machine, and versions of the corresponding drivers need to be maintained. Moreover, the processing of data forwarding by a virtual switch through an application program consumes CPU (Central Processing Unit) resources of the virtual switch, especially in a process of performing a large amount of data forwarding within a short time, the resource consumption of the virtual switch is relatively large.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/ computer-readable instructions as permitted by the context above and throughout the present disclosure.

The purpose of embodiments of the present disclosure is to provide methods, apparatuses, devices, and systems for packet forwarding to solve the problems that a virtual switch consumes a relatively large amount of resources in a process of performing packet forwarding and needs to additionally install a corresponding driver inside a virtual machine in existing technologies.

To solve the above technical problems, the embodiments of the present disclosure are implemented as follows:

The embodiments of the present disclosure provide a packet forwarding system. The system includes a target virtual machine, a virtual switch and a network card device, wherein:

the target virtual machine is configured to send a first packet to the virtual switch;

the virtual switch is configured to add input port information to the first packet to obtain a second packet after receiving the first packet sent by the target virtual machine, and forward the second packet to the network card device; and the network card device is configured to determine a corresponding first forwarding rule based on the input port information included in the second packet in response to receiving the second packet sent by the virtual switch, and perform forwarding processing on the second packet based on the first forwarding rule.

In implementations, the virtual switch is further configured to set a hardware acceleration identification for the first packet; and the network card device is configured to obtain the first forwarding rule that matches with the input port information and other information included in the second packet, in response to receiving the second packet sent by the virtual switch and determining that the second packet includes the hardware acceleration identification.

In implementations, the network card device is configured to obtain a forwarding rule that matches the input port information and other information included in the second packet from a forwarding rule list, and set the obtained forwarding rule as the first forwarding rule.

In implementations, the network card device is further configured to mark the second packet as a matching failure packet, and send the second packet to the virtual switch, if a matching for the first forwarding rule is not found; and the virtual switch is further configured to perform forwarding processing of the second packet, and send the first forwarding rule to the network card device, after receiving the second packet that is marked as the matching failure packet sent by the network card device.

In implementations, the virtual switch is configured to add the input port information to a predetermined field of metadata of the first packet.

In implementations, the virtual switch is a Virtio-based virtual switch, and the target virtual machine is a Virtio-based virtual machine.

In implementations, the predetermined field is a Userdata field of DpdkRte_Mbuf.

The embodiments of the present disclosure provide a packet forwarding system. The system includes a target virtual machine, a virtual switch and a network card device, wherein:

the network card device is configured to obtain a first packet to be forwarded, and obtain a first forwarding rule matching the first packet according to information included in the first packet, and process the first packet based on the first forwarding rule, add output port information to the first packet to obtain a second packet, and forward the second packet to the virtual switch; and the virtual switch is configured to obtain a corresponding back-end processing program according to the output port information after receiving the second packet sent by the network card device, and forward the second packet to the target virtual machine based on the back-end processing program.

In implementations, the network card device is further configured to add input port information to the first packet to obtain a third packet, mark the third packet to the packet as a matching failure packet, and forward the third packet to the virtual switch, if a matching for the first forwarding rule is not found;

the virtual switch is further configured to forward the third packet to the target virtual machine according to the input port information after receiving the third packet sent by the network card device, and send the first forwarding rule to the network card device.

In implementations, the network card device is configured to add the output port information or the input port information to a predetermined field of metadata of the first packet.

In implementations, the virtual switch is a Virtio-based virtual switch, and the target virtual machine is a Virtio-based virtual machine.

In implementations, the predetermined field is a predefined field and is a Userdata field of DpdkRte_Mbuf.

The embodiments of the present disclosure provide a packet forwarding method. The method includes:
receiving a first packet sent by a target virtual machine;
adding input port information to the first packet to obtain a second packet;
forwarding the second packet to a network card device, to cause the network card device to determine a corresponding first forwarding rule based on the input port information in response to receiving the second packet, and perform forwarding processing on the second packet based on the first forwarding rule.

In implementations, adding the input port information to the first packet to obtain the second packet includes:
adding the input port information to the first packet, and setting a hardware acceleration identification for the first packet to obtain the second packet.

In implementations, adding the input port information to the first packet includes:
adding the input port information to a predetermined field of metadata of the first packet.

In implementations, the predetermined field is a Userdata field of DpdkRte_Mbuf.

In implementations, the method further includes:
performing forwarding processing on the second packet in response to receiving the second packet that is marked as the matching failure packet sent by the network card device, and sending the first forwarding rule to the network card device.

The embodiments of the present disclosure provide a packet forwarding method. The method includes:
receiving a second packet sent by a virtual switch, the second packet being obtained by the virtual switch by adding input port information to a first packet that is sent by a target virtual machine;

determining a corresponding first forwarding rule based on the input port information; and
performing forwarding processing on the second packet based on the first forwarding rule.

In implementations, determining the corresponding first forwarding rule based on the input port information includes:
obtaining a forwarding rule matching the input port information and other information included in the second packet from a list of forwarding rules, and setting the obtained forwarding rule as the first forwarding rule.

In implementations, after receiving the second packet sent by the virtual switch, the method further includes:
marking the second packet as a matching failure packet if a matching for the first forwarding rule is not found, and sending the first packet to the virtual switch, to cause the virtual switch to perform forwarding processing the second packet; and
receiving the first forwarding rule sent by the virtual switch.

In implementations, determining the corresponding first forwarding rule based on the input port information includes:
determining the corresponding first forwarding rule based on the input port information if the second packet includes a hardware acceleration identification.

The embodiments of the present disclosure provide a packet forwarding method. The method includes:
obtaining a first packet to be forwarded;
obtaining a first forwarding rule that matches the first packet according to information included in the first packet;
processing the first packet based on the first forwarding rule, and adding output port information to the first packet to obtain a second packet; and
forwarding the second packet to the virtual switch.

In implementations, after obtaining the first packet to be forwarded, the method further includes:
adding input port information to the first packet to obtain a third packet if a matching for the first forwarding rule is not found;
marking the third packet as a matching failure packet, and forwarding the third packet to the virtual switch.

In implementations, the method further includes:
receiving the first forwarding rule sent by the virtual switch.

In implementations, adding the output port information to the first packet includes:
adding the output port information or the input port information to a predetermined field of metadata of the first packet.

In implementations, the predetermined field is a Userdata field of DpdkRte_Mbuf.

The embodiments of the present disclosure provide a packet forwarding method. The method includes:
receiving a second packet sent by a network card device, the second packet being obtained after the network card device processes an obtained first packet based on a first forwarding rule that matches the first packet, and adds output port information to the first packet; and
forwarding the second packet to a target virtual machine according to the output port information.

In implementations, forwarding the second packet to the target virtual machine according to the output port information includes:

obtaining a corresponding back-end processing program according to the output port information; and forwarding the second packet to the target virtual machine based on the back-end processing program.

In implementations, the method further includes:

receiving a third packet that is marked as a matching failure packet sent by the network card device, the third packet being obtained after the network card device adds input port information to the first packet; and forwarding the third packet to the target virtual machine according to the input port information, and sending the first forwarding rule to the network card device.

The embodiments of the present specification provide a packet forwarding apparatus. The apparatus includes:

a packet receiving module configured to receive a first packet sent by a target virtual machine;

a packet processing module configured to add input port information to the first packet to obtain a second packet;

a packet forwarding module configured to forward the second packet to a network card device, to cause the network card device to determine a corresponding first forwarding rule based on the input port information in response to receiving the second packet, and perform forwarding processing on the second packet based on the first forwarding rule.

The embodiments of the present specification provide a packet forwarding apparatus. The apparatus includes:

a packet receiving module configured to receive a second packet sent by a virtual switch, the second packet being obtained by the virtual switch by adding input port information to a first packet that is sent by a target virtual machine;

a forwarding rule determination module configured to determine a corresponding first forwarding rule based on the input port information; and a forwarding processing module configured to perform forwarding processing on the second packet based on the first forwarding rule.

The embodiments of the present specification provide a packet forwarding apparatus. The apparatus includes:

a packet acquisition module configured to obtain a first packet to be forwarded;

a forwarding rule acquisition module configured to acquire a first forwarding rule matching the first packet according to information included in the first packet;

a packet processing module configured to process the first packet based on the first forwarding rule, and add output port information to the first packet to obtain a second packet; and a packet forwarding module configured to forward the second packet to a virtual switch.

The embodiments of the present specification provide a packet forwarding apparatus. The apparatus includes:

a packet receiving module configured to receive a second packet sent by a network card device, the second packet being obtained after the network card device processes an obtained first packet based on a first forwarding rule that matches the first packet, and adds output port information to the first packet; and a packet forwarding module configured to forward the second packet to a target virtual machine according to the output port information.

The embodiments of the present disclosure provide a packet forwarding device. The packet forwarding device includes:

a processor; and a memory adapted to store computer-executable instructions that, when executed, cause the processor to:

receive a first packet sent by a target virtual machine;

add input port information to the first packet to obtain a second packet; and forward the second packet to a network card device, to cause the network card device to determine a corresponding first forwarding rule based on the input port information in response to receiving the second packet, and perform forwarding processing on the second packet based on the first forwarding rule.

The embodiments of the present disclosure provide a packet forwarding device. The packet forwarding device includes:

a processor; and a memory adapted to store computer-executable instructions that, when executed, cause the processor to:

receive a second packet sent by a virtual switch, where the second packet is obtained after a virtual switch adds input port information to a first packet sent by a target virtual machine;

determine a corresponding first forwarding rule based on the input port information; and perform forwarding processing on the second packet based on the first forwarding rule.

The embodiments of the present disclosure provide a packet forwarding device. The packet forwarding device includes:

a processor; and a memory adapted to store computer-executable instructions that, when executed, cause the processor to:

obtain a first packet to be forwarded;

obtain a first forwarding rule that matches the first packet according to information included in the first packet;

process the first packet based on the first forwarding rule, and add output port information to the first packet to obtain a second packet; and forward the second packet to a virtual switch.

The embodiments of the present disclosure provide a packet forwarding device. The packet forwarding device includes:

a processor; and a memory adapted to store computer-executable instructions that, when executed, cause the processor to:

receive a second packet sent by a network card device, the second packet being obtained after the network card device processes an obtained first packet based on a first forwarding rule that matches the first packet, and adds output port information to the first packet; and forward the second packet to a target virtual machine according to the output port information.

As can be seen from the technical solutions provided by the above embodiments of the present disclosure, the embodiments of the present disclosure obtain a first packet to be forwarded, obtain a first forwarding rule that matches information included in the first packet from a rule database according to the information included in the first packet, and perform forwarding processing on the first packet based on the first forwarding rule. As such, after the first packet reaches a network card device, the network card device matches and finds a forwarding rule that is set in the network card device according to packet information of the first packet, and performs a specific packet forwarding processing according to the first forwarding rule that is matched and found. The entire packet forwarding logic mentioned above is completed by the network card device, without the need for a virtual switch to consume resources such as a host CPU for processing. Furthermore, there is no need to install a corresponding driver in the virtual machine and maintain a corresponding driver version, thereby realizing high-performance packet forwarding.

BRIEF DESCRIPTION OF THE DRAWINGS

In order to more clearly describe technical solutions in implementations, drawings that are needed for describing the embodiments or the existing technologies are briefly described hereinafter. Apparently, the drawings in the following description merely represent some of the embodiments described in the present disclosure. For one of ordinary skill in the art, other drawings can be obtained from these drawings without making any creative effort.

DETAILED DESCRIPTION

The embodiments of the present disclosure provide methods, apparatuses, devices, and systems for packet forwarding.

In order to enable one skilled in the art to better understand the technical solutions in the present disclosure, the technical solutions will be clearly and completely described hereinafter in conjunction with the drawings. Apparently, the described embodiments represent only some and not all of the embodiments of the present disclosure. Based on the embodiments in the present disclosure, all other embodiments obtained by one of ordinary skill in the art without making any creative effort shall fall within the scope of protection of the present disclosure.

It should be noted that same noun expressions may appear in the following embodiments, such as a first packet, a second packet, a third packet, . . . , and a first forwarding rule, etc., described in various embodiments. In different embodiments, the same noun expressions described above do not necessarily refer to exactly the same objects. For example, a first packet described in one example embodiment and a first packet in another example embodiment may be different packets, and a first forwarding rule described in one example embodiment and a first forwarding rule in another example embodiment may be different forwarding rules, etc. Different example embodiments can be mutually independent, and the same nouns that appear are merely used for the sake of description.

Figure 1:
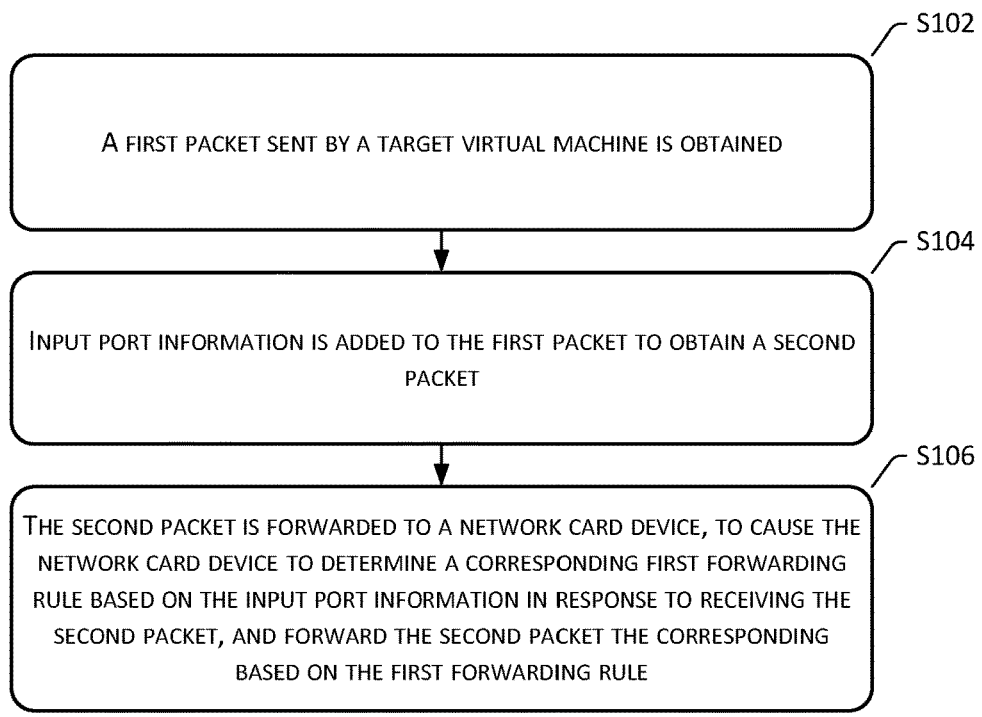
FIG. 1 is an example packet forwarding method in the present disclosure.

As shown in FIG. 1, the embodiments of the present disclosure provide a packet forwarding method 100. An execution subject of the method may be a virtual switch. The virtual switch may be deployed in a terminal device or a server. The terminal device may be a device such as a personal computer, etc., or may also be a mobile terminal device such as a mobile phone, a tablet, etc. The server can be an independent server or a server cluster composed of multiple servers. Moreover, the server can be a back-end server of a certain service or a back-end server of a certain website (such as a shopping website or a payment application), etc. This method can be used in processing such as performing hardware acceleration through a network card device in a process of packet forwarding. The method 100 may specifically include the following steps:

At step S102, a first packet sent by a target virtual machine is obtained.

A virtual machine can be a complete computer system simulated by software, having complete hardware system functions and running in a completely isolated environment. A target virtual machine in implementations can be any virtual machine, such as a corresponding virtual machine of a certain service, etc. A first packet may be any packet including any content. A packet can be a data unit exchanged and transmitted in a network, i.e., a data block to be sent by a site at one time. Packets may include complete data information to be sent, and sizes thereof can be non-fixed, with lengths being not limited and variable. Packets will be continuously encapsulated into groups, packets, frames, etc. during transmission. An encapsulation method can be to add some information segments, and the added information segments can be data that is organized in a certain format in a packet header. A packet can include a packet type, a packet version, a packet length, and a packet entity.

Figure 2:
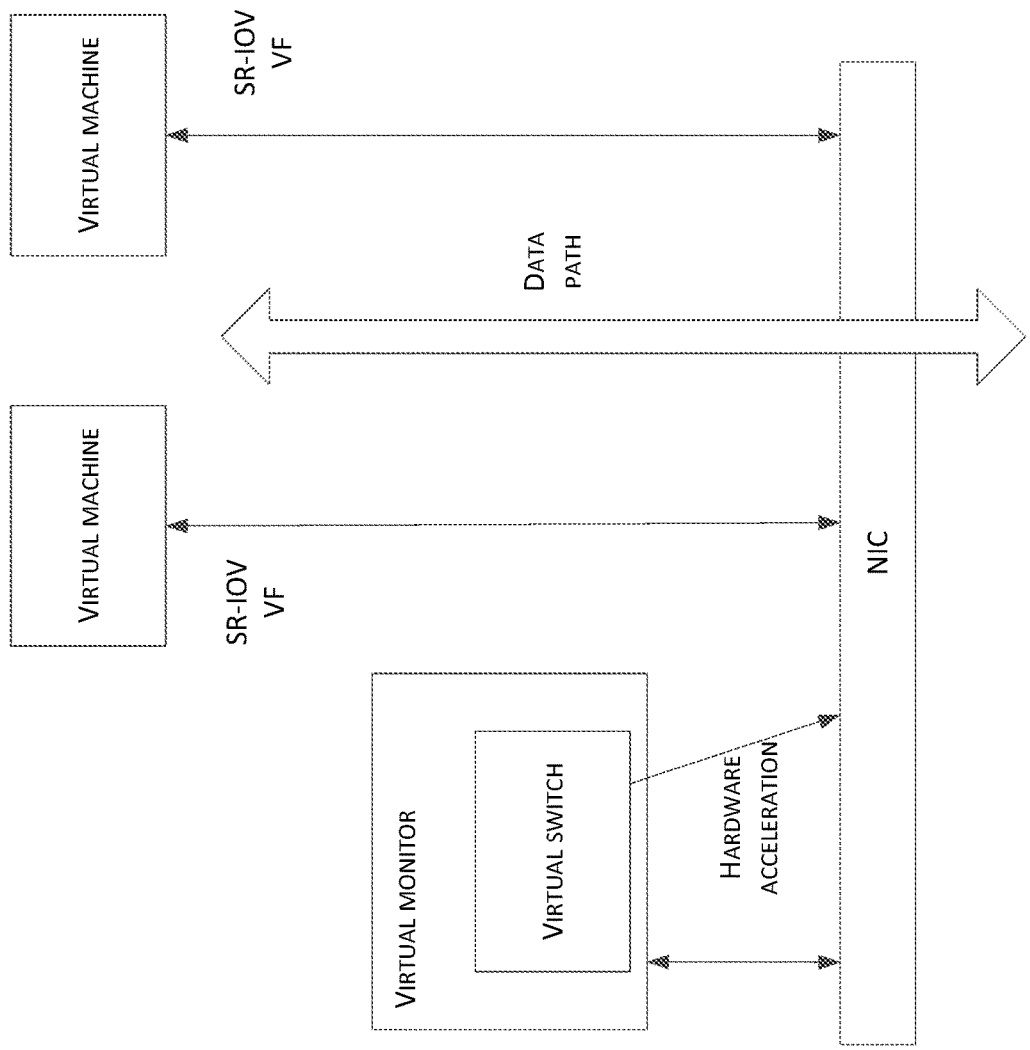
FIG. 2 is a schematic diagram of a packet forwarding logic of a virtual machine based on SR-IOV in related technologies.

In implementations, in order to realize data forwarding of a virtual switch (Vswitch), a numbers of methods can be used and implemented. For example, a virtual switch can perform data forwarding through a related application. However, in practical applications, the above data forwarding method will consume CPU resources of the virtual switch. This is especially true in a process of performing a large amount of data forwarding in a short time, where the virtual switch consumes a lot of resources. In addition to the above data forwarding processing, other forwarding methods can also be included. For example, in order to achieve high-performance forwarding of a virtual switch (Vswitch), the industry generally begins to move the forwarding logic of a virtual switch to a network card device for hardware acceleration (Offload). High-performance forwarding is achieved through programmable resources of the network card device. Generally, as shown in FIG. 2, this can be implemented based on a SR-IOV mechanism. In such scenario, a network card device is directly connected to an internal part of a container, and a VF (Visual FoxPro) instance is virtualized from the network card device and is directly provided to a virtual machine for use to complete data forwarding, thereby eliminating the need for a virtual switch to perform data forwarding, etc. However, under the SR-IOV mechanism, for network card devices of different manufacturers, corresponding network card device drivers need to be installed on a virtual machine. However, many network card device drivers are not integrated into a Linux Kernel, and the corresponding drivers need to be additionally installed inside the virtual machine, with the need of maintaining versions of the corresponding drivers. Moreover, a hot migration of virtual machines is not supported under the SR-IOV mechanism, which brings great complexity and limitations to the use and operation and maintenance of virtual machines. As a result, solutions of hardware acceleration of virtual switches cannot be deployed on a large scale. Accordingly, the embodiments of the present disclosure provide a solution for moving the forwarding logic of a virtual switch to a network card device for hardware acceleration, which may specifically include the following content:

In practical applications, processing of sending and receiving packets by a virtual machine in a solution of hardware acceleration of a virtual switch may include two scenarios, i.e., a scenario where a virtual machine sends a packet to a physical network and a scenario where a physical network sends a packet to a virtual machine. For a scenario where a virtual machine sends a packet to a physical network, the virtual machine may send a certain packet (i.e., a first packet) to a virtual switch. A process of sending a packet to a virtual switch by a virtual machine can be implemented in various ways, for example, can be implemented through Virtio.

At step S104, input port information is added to the first packet to obtain a second packet.

The input port information may be Input Port information, which may specifically be a port number, etc.

In implementations, after a virtual switch receives a first packet, in order to enable a network card device to forward the first packet smoothly, the first packet can be analyzed to determine whether the first packet needs hardware acceleration. If not needed, the first packet can be directly forwarded through a common processing party. If needed, a corresponding identification or mark for the first packet can be set (for example, a label for the first packet can be set, or corresponding identification information can be added to the first packet, etc.) to indicate that the first packet requires hardware acceleration, or forwarding of the packet may be set to require hardware acceleration by default according to actual conditions, for example. The virtual switch may determine input port information corresponding to the first packet based on related information in the first packet. The determined input port information can then be added to the first packet. In practical applications, the input port information can be added to a preset field, for example. Through the foregoing processing, a second packet with the added input port information can be obtained.

At step S106, the second packet is forwarded to a network card device, to cause the network card device to determine a corresponding first forwarding rule based on the input port information in response to receiving the second packet, and forward the second packet the corresponding based on the first forwarding rule.

In implementations, the network card device may determine a matching field in the second packet that matches the above-mentioned input port information based on the input port information, obtain relevant information based on the determined matching field, and determine the corresponding first forwarding rule.

Figure 3:
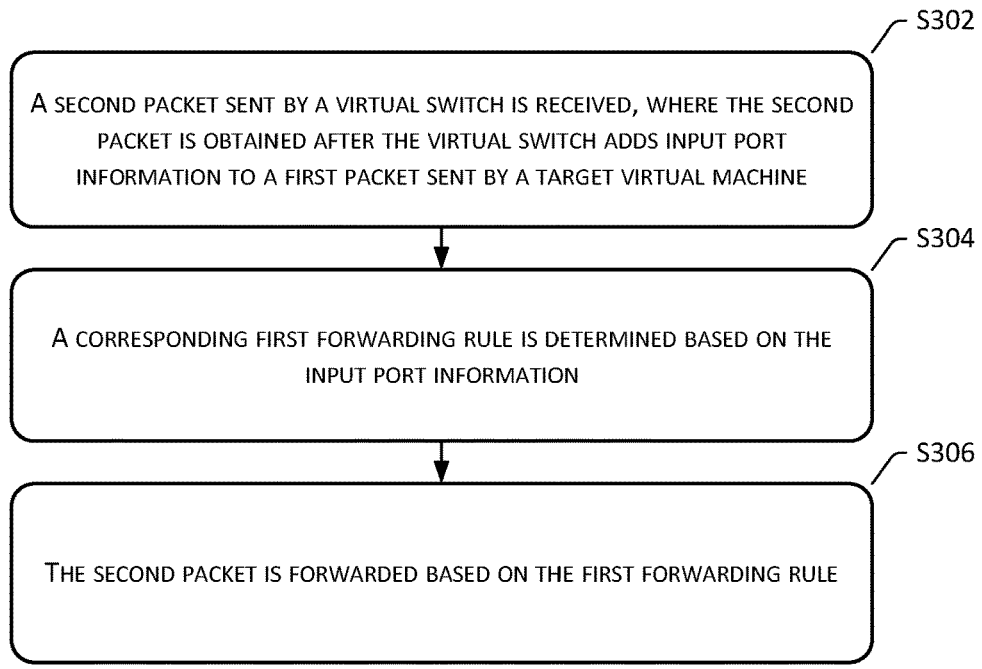
FIG. 3 is another example packet forwarding method in the present disclosure.

As shown in FIG. 3, the embodiments of the present disclosure provide a packet forwarding method 300. An execution subject of the method can be a network card device. The network card device can be a device composed of one or more network card components and having network card functions. The network card device can also be a terminal device or server with network card functions, etc. The terminal device can be a device such as a personal computer, etc., or a mobile terminal device, such as a mobile phone or a tablet computer, etc. The server can be an independent server or may also be a server cluster composed of multiple servers. Moreover, the server can be a back-end server of a certain service or a back-end server of a certain website (such as a shopping website or a payment application), for example. This method can be used in processing such as performing hardware acceleration through a network card device in a process of packet forwarding. The method 300 may specifically include the following steps:

At step S302, a second packet sent by a virtual switch is received, where the second packet is obtained after the virtual switch adds input port information to a first packet sent by a target virtual machine.

At step S304, a corresponding first forwarding rule is determined based on the input port information.

The first forwarding rule may be any forwarding rule in a forwarding rule database. Different network card devices can be set with different forwarding rules, and different packets can also be set with different forwarding rules.

In implementations, a new generation of network interface card (NIC) devices is usually equipped with certain TCAM (Ternary Content Addressable Memory) or SRAM (Static Random-Access Memory, static random access memory) hardware programmable resources, and can be written with specific forwarding rules according to needs. Corresponding written forwarding rules can be set into a network card device. After a first packet is obtained, the network card device can extract input port information in the first packet. A search for a forwarding rule that matches the input port information can then be performed in a forwarding rule database using input port information. A forwarding rule that is found is a first forwarding rule. If the first forwarding rule that matches the input port information as above described is not found, the first packet can be forwarded through other preset methods. For example, as mentioned above, the first packet can be forwarded to a virtual switch, and the virtual switch can forward the first packet through a corresponding application program, etc. In practical applications, in addition to the above-mentioned processing, the first packet can also be forwarded in many other ways, and details thereof can be set according to an actual situation, which are not limited by the embodiments of the present disclosure.

At step S306, the second packet is forwarded based on the first forwarding rule.

In implementations, after the first forwarding rule that matches the input port information included in the first packet is found, the network card device can forward the first packet to a corresponding receiving object through a forwarding method recorded in the first forwarding rule. For example, for a scenario in which a physical network sends a packet to a virtual machine, the network card device may forward the first packet to a virtual switch according to the first forwarding rule, and the virtual switch may then forward the first packet to the virtual machine.

Through the above processing method, after the first packet arrives at the network card device, the network card device will perform a match for forwarding rules set in the network card device based on the input port information of the first packet, and perform specific packet forwarding processing according to the matched first forwarding rule. The entire packet forwarding logic described above is completed by the network card device, and the virtual switch does not need to consume resources such as host CPU for processing, thereby achieving high-performance packet forwarding.

It should be noted that the network card device can complete operations such as Push Vxlan when the network card device forwards the second packet based on the first forwarding rule, and other devices (such as virtual switches) are not required to perform such operations as Push Vxlan, for example. Vxlan (Virtual Extensible LAN) is an Overlay network technology that uses a MAC in UDP method for performing encapsulation, and can include a 50-byte encapsulated packet header.

The packet forwarding method provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

Figure 4:
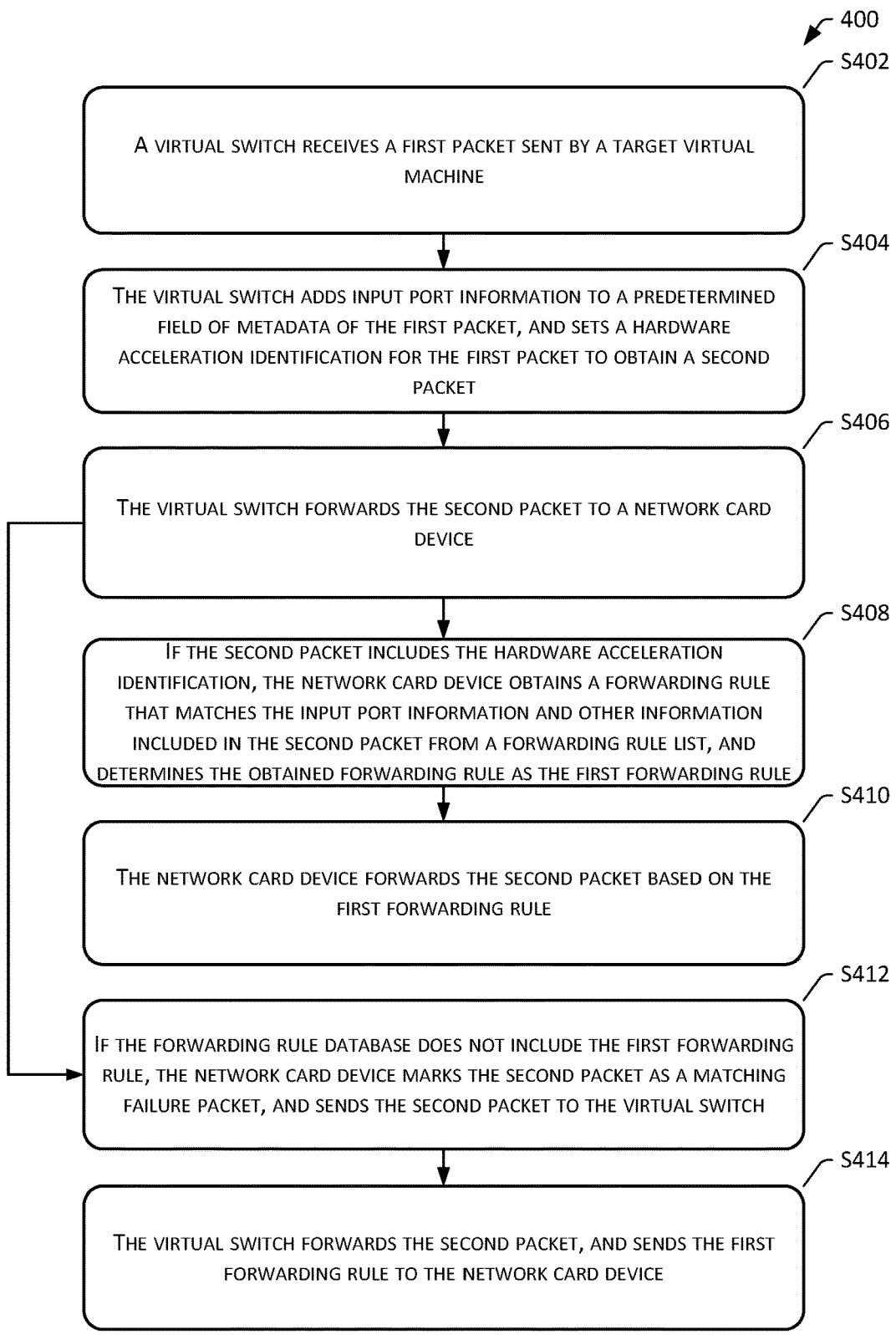
FIG. 4 is still another example packet forwarding method in the present disclosure.

As shown in FIG. 4, the embodiments of the present disclosure provide a packet forwarding method 400. Execution subjects of the method can be a network card device and a virtual switch. The network card device may be a device composed of one or more network card components and having network card functions. The network card device may also be a terminal device or server with network card functions. The virtual switch can be deployed in a terminal device or server, etc. The terminal device can be a device such as a personal computer, etc., or a mobile terminal device such as a mobile phone, a tablet computer, etc. The server can be an independent server or a server cluster composed of multiple servers. Moreover, the server can be a back-end server of a certain service or a back-end server of a certain website (such as a shopping website or a payment application). This method can be used in processing such as performing hardware acceleration through a network card device in a process of packet forwarding.

Figure 5:
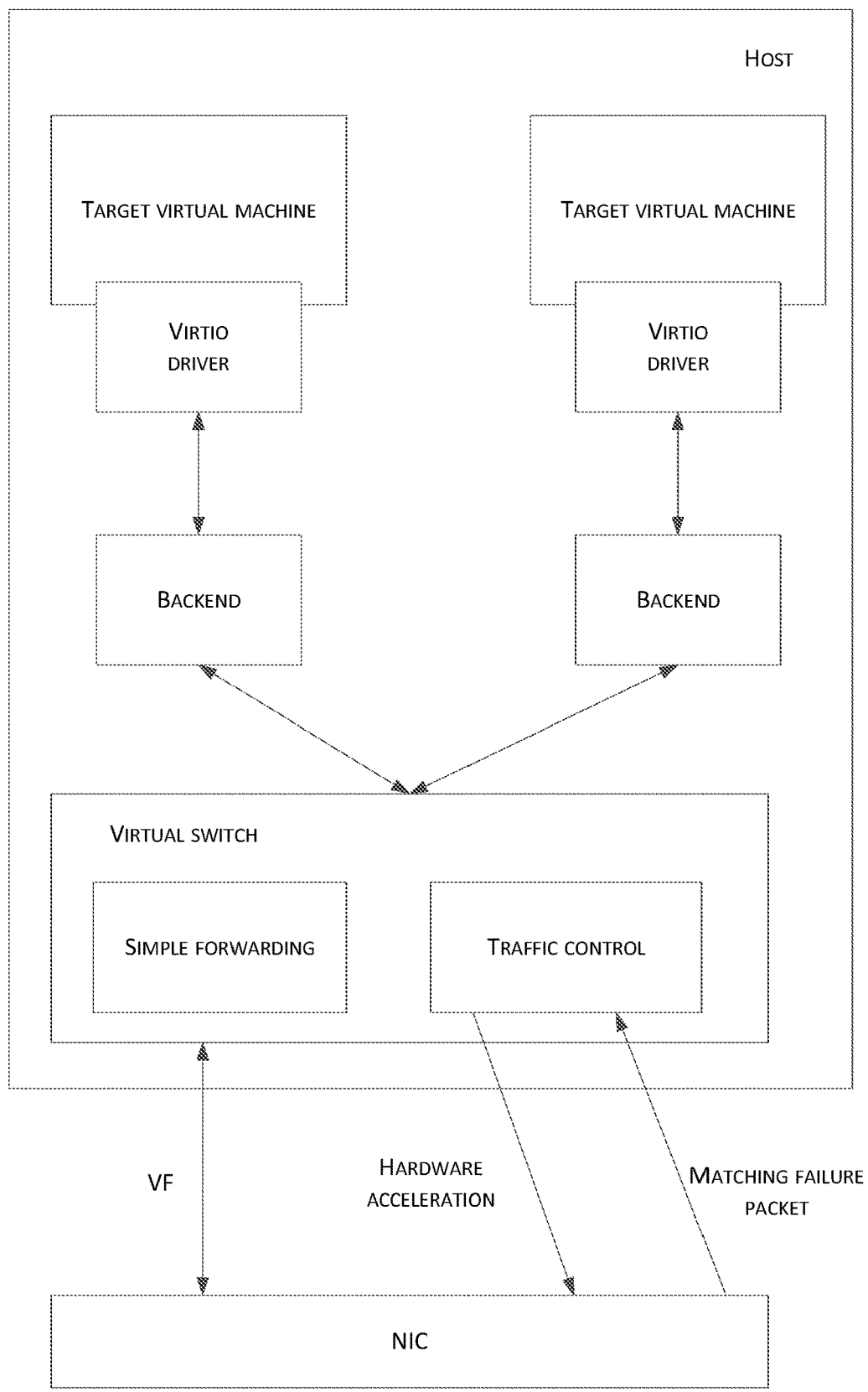
FIG. 5 is a schematic diagram of a packet forwarding system based on a Virtio virtual switch in the present disclosure.

In implementations, a scenario in which a virtual machine sends a packet to a physical network is used for description. A virtual switch in implementations may be a Virtio-based virtual switch, for example, as shown in FIG. 5. The Virtio-based virtual switch may have the following advantages: VirtioDriver on a virtual machine can be implemented by way of software, does not rely on any hardware devices, and has good compatibility; such VirtioDriver is usually integrated from Linux Kernel; and a hot migration of virtual machine is supported. The method 400 may specifically include the following steps:

At step S402, a virtual switch receives a first packet sent by a target virtual machine.

The content of step S402 as described above is the same as the content of step S102. For details of processing process of step S402 as described above, reference can be made to the related content of step S102, which is not repeated herein.

At step S404, the virtual switch adds input port information to a predetermined field of metadata of the first packet, and sets a hardware acceleration identification for the first packet to obtain a second packet.

The predetermined field may be a Userdata field of DpdkRte_Mbuf. The metadata may be Metadata data, etc. The hardware acceleration identification can be set in a variety of ways, such as setting the hardware acceleration identification by setting a tag, or setting the hardware acceleration identification by setting marking information (such as a number or character, etc.), for example. Details thereof can be set according to an actual situation, which are not limited by the embodiments of the present disclosure.

In implementations, in order to enable the network card device to smoothly forward the second packet, the virtual switch may determine input port information corresponding to the second packet based on related information in the first packet after receiving the first packet. Metadata included in the first packet can then be obtained, and the determined input port information can be added to the metadata. In practical applications, the input port information can be added to a Userdata field of Rte_Mbuf of DPDK (Data Plane Development Kit), for example.

A packet determination mechanism can be set in the virtual switch. Through the packet determination mechanism, a determination can be made about whether a hardware acceleration (i.e., Offload) mechanism needs to be activated for forwarding the packet. In practical applications, which packets need to activate the hardware acceleration mechanism to forward for forwarding, and which packets do not need to activate the hardware acceleration mechanism for forwarding can be set up in advance. Alternatively, all types of packets can be set to be needed to start the hardware acceleration mechanism, for example. After obtaining the first packet, the virtual switch can extract information included in the first packet, analyze the extracted information, and determine whether to activate the hardware acceleration mechanism when forwarding the first packet based on an obtained analysis result. If the obtained analysis result indicates that the hardware acceleration mechanism needs to be activated in the process of forwarding the first packet, a hardware acceleration identification can be set for the first packet, and the second packet including the input port information and the hardware acceleration identification can be obtained by the above method. If the obtained analysis result indicates that the hardware acceleration mechanism does not need to be activated in the process of forwarding the first packet, the first packet can be forwarded based on a current commonly used packet forwarding method, for example, through a corresponding application program in the virtual switch to forward the first packet, etc.

At step S406, the virtual switch forwards the second packet to a network card device.

In implementations, the virtual switch may send the first packet to the network card device through VF.

At step S408, if the second packet includes the hardware acceleration identification, the network card device obtains a forwarding rule that matches the input port information and other information included in the second packet from a forwarding rule list, and determines the obtained forwarding rule as the first forwarding rule.

The forwarding rule list may be a list for storing forwarding rules of the network card device, and the forwarding rules may be related rules for the network card device to forward data.

At step S410, the network card device forwards the second packet based on the first forwarding rule.

The contents of step S408 and step S410 are the same as those of step S304 and step S306. For details of processing process of step S408 and step S410, reference can be made to the related contents of step S304 and step S306, which are not repeated herein.

The foregoing processing process is executed when the first forwarding rule is included in the forwarding rule list. When the first forwarding rule is not included in the forwarding rule list, the following steps S412 and S414 can be executed.

At step S412, if the forwarding rule database does not include the first forwarding rule, the network card device marks the second packet as a matching failure packet, and sends the second packet to the virtual switch.

In implementations, in an initial state, the network card device has no forwarding rule. After the first packet reaches the network card device, no matching forwarding rule can be found. Therefore, the network card device can send the packet to the virtual switch for processing. Specifically, after obtaining the first packet, the network card device can extract relevant information content in the first packet, and analyze the extracted content to obtain a corresponding analysis result. Through the obtained analysis result, the forwarding rule matching the analysis result can then be searched in the forwarding rule database. If the first forwarding rule matching the above analysis result is not found, a determination can be made that the forwarding rule database does not include the first forwarding rule. At this time, the first packet can be marked as a matching failure packet to indicate that the first packet cannot be forwarded by the network card device. At this time, the first packet can be sent to the virtual switch.

At step S414, the virtual switch forwards the second packet, and sends the first forwarding rule to the network card device.

In implementations, the virtual switch can be configured with corresponding application program or software. When the virtual switch receives the first packet and the first packet is marked as a matching failure packet, the virtual switch can forward the first packet through the pre-configured application program or software as described above. At the same time, the virtual switch can also generate a forwarding rule (i.e., a first forwarding rule) that matches information included in the first packet in a process of forwarding the first packet through the application or software, and can send the first forwarding rule to the network card device. After receiving the first forwarding rule, the network card device may set the first forwarding rule as a forwarding rule that matches the information included in the first packet. When obtaining the first packet to be forwarded again, the network card device can forward the first packet based on the first forwarding rule, i.e., can perform the processing of step S408 and step S410 as described above, or perform the processing of step S402 to step S410 as described above. Through the above processing method, the virtual switch acts as a proxy between the virto and the VF, and realizes forwarding of traffic between the virtual machine and the network card device.

It should be noted that operations such as Push Vxlan can be completed by the virtual switch in the process of forwarding the second packet by the virtual switch, where Vxlan (Virtual Extensible LAN) is an Overlay network Technology that uses a MAC in UDP method for performing encapsulation, and a 50-byte encapsulated packet header can be included.

The packet forwarding method provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

Figure 6:
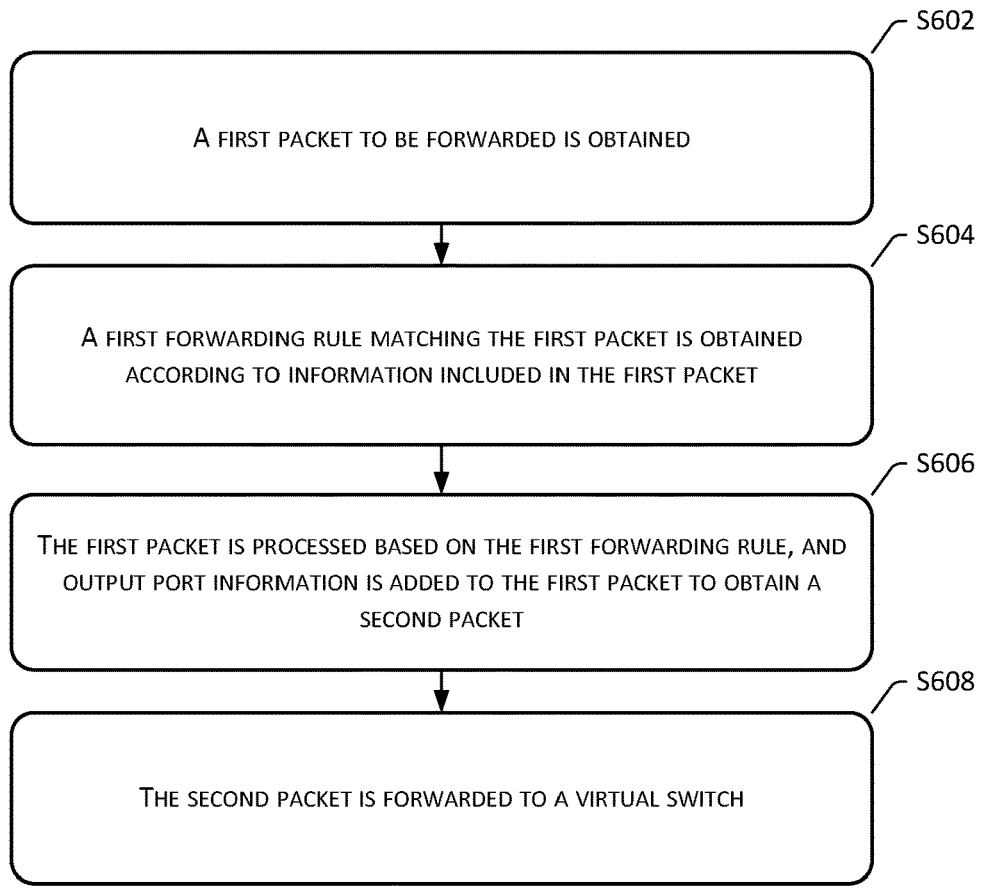
FIG. 6 is another example packet forwarding method in the present disclosure.

As shown in FIG. 6, the embodiments of the present disclosure provide a packet forwarding method 600. An execution subject of the method can be a network card device. The network card device can be a device with network card functions and composed of one or more network card components. The network card device can also be a terminal device or server with network card functions. The terminal device can be a device, such as a personal computer, etc., or a mobile terminal device, such as a mobile phone or a tablet computer, etc. The server can be an independent server or a server cluster composed of multiple servers. Moreover, the server can be a back-end server of a certain service or a back-end server of a certain website (such as a shopping website or a payment application). This method can be used in processing such as performing hardware acceleration through a network card device in a process of packet forwarding. The method 600 may specifically include the following steps:

At step S602, a first packet to be forwarded is obtained.

In practical applications, this embodiment may be intended for a scenario in which a physical network sends a packet to a virtual machine, for example. In this scenario, a network card device may directly obtain a first packet to be forwarded.

At step S604, a first forwarding rule matching the first packet is obtained according to information included in the first packet.

In implementations, after obtaining the first packet, the network card device may analyze the first packet to determine whether the first packet needs hardware acceleration. If not needed, a commonly used processing party can directly be used to forward the packet. If needed, all or part of the information included in the first packet can be analyzed to obtain a corresponding analysis result. The network card device may then obtain a matching forwarding rule based on the analysis result, and may determine the obtained forwarding rule as a first forwarding rule that matches the first packet.

At step S606, the first packet is processed based on the first forwarding rule, and output port information is added to the first packet to obtain a second packet.

In implementations, the network card device can process relevant data in the first packet through a packet processing method recorded in the first forwarding rule. For example, the first forwarding rule records a packet processing method that modifies parameters A and B in the packet to the ones that conform to a predetermined rule, and the parameters A and B in the first packet can thus be modified through the foregoing packet processing method recorded in the first forwarding rule, etc. The network card device can then also obtain output port information of the first packet, and can add the output port information to the first packet. In practical applications, the output port information can be added to a preset field, etc., for example. Through the above processing, a second packet with the added output port information can be obtained.

It should be noted that the network card device can complete operations such as Push Vxlan, when the network card device forwards the first packet based on the first forwarding rule, and other devices (such as virtual switches) are not required to perform such operations as Push Vxlan. Vxlan (Virtual Extensible LAN) is an Overlay network technology that uses a MAC in UDP method for performing encapsulation, which can include a 50-byte encapsulated packet header.

At step S608, the second packet is forwarded to a virtual switch.

Figure 7:
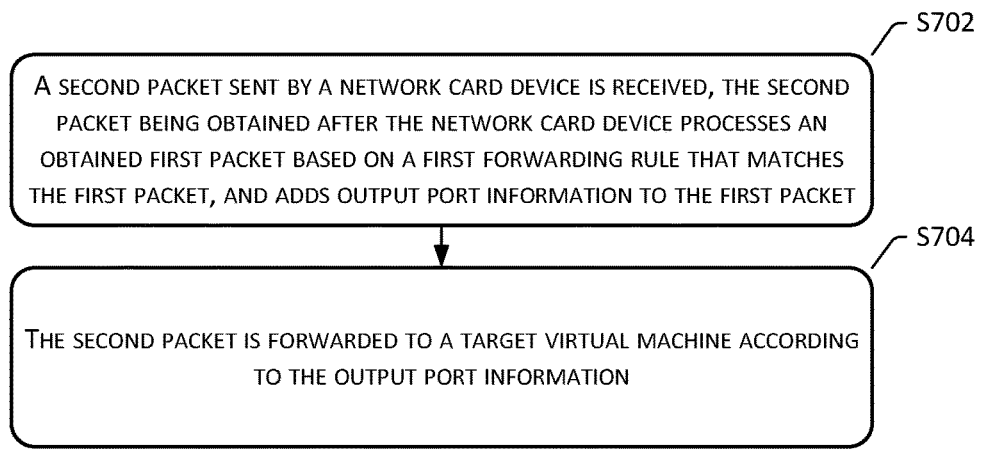
FIG. 7 is another example packet forwarding method in the present disclosure.

As shown in FIG. 7, the embodiments of the present disclosure provide a packet forwarding method 700. An execution subject of the method may be a virtual switch. The virtual switch may be deployed in a terminal device or a server. The terminal device may be a device such as a personal computer, etc., or may also be a mobile terminal device such as a mobile phone, a tablet, etc. The server can be an independent server or a server cluster composed of multiple servers. Moreover, the server can be a back-end server of a certain service or a back-end server of a certain website (such as a shopping website or a payment application), etc. This method can be used in processing such as performing hardware acceleration through a network card device in a process of packet forwarding. The method 700 may specifically include the following steps:

At step S702, a second packet sent by a network card device is received, the second packet being obtained after the network card device processes an obtained first packet based on a first forwarding rule that matches the first packet, and adds output port information to the first packet.

At step S704, the second packet is forwarded to a target virtual machine according to the output port information.

In implementations, the virtual switch can determine a matching field in the second packet that matches the output port information according to the output port information, obtain related information based on the determined matching field, and forward the second packet to the target virtual machine accordingly.

The packet forwarding method provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

Figure 8:
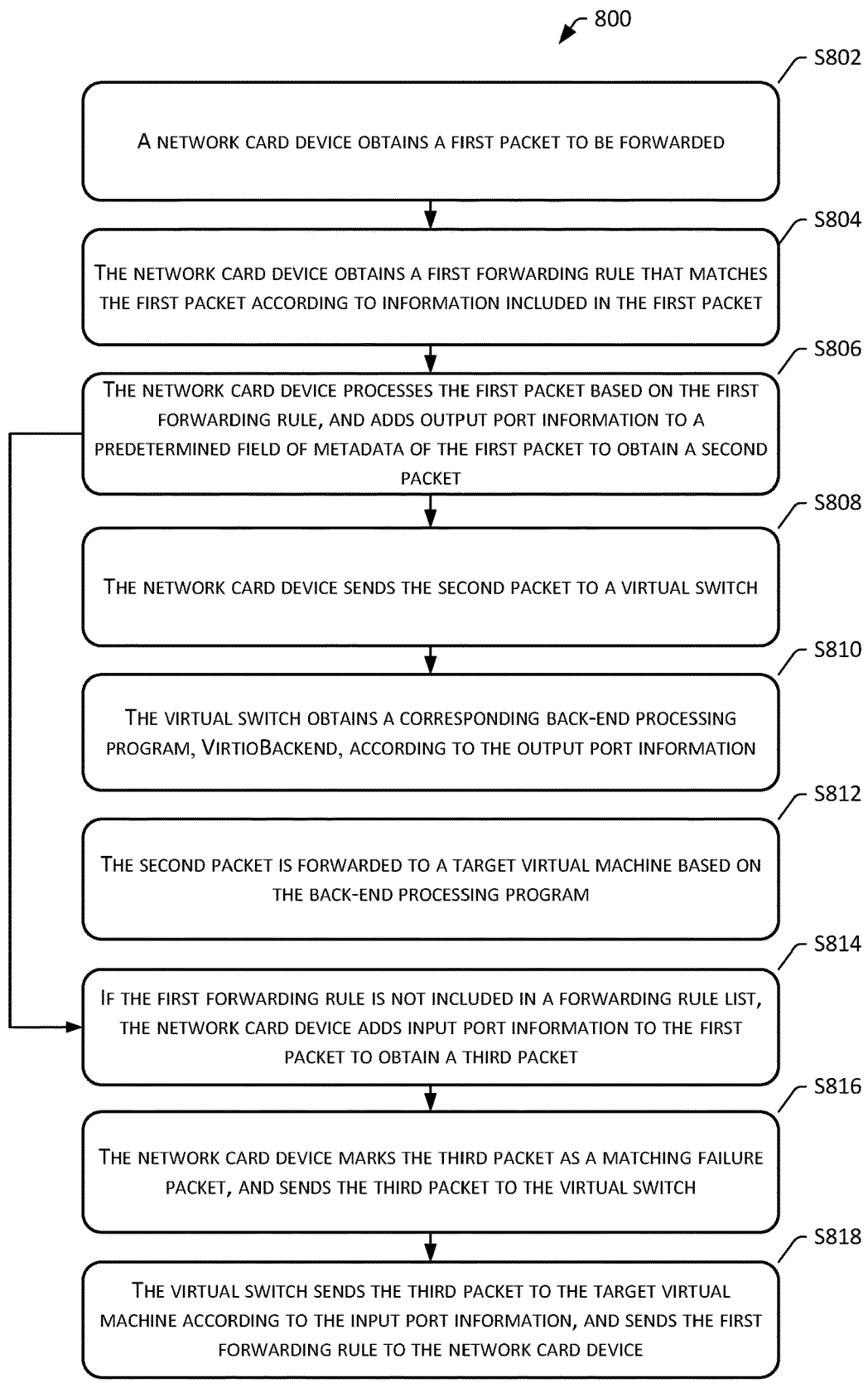
FIG. 8 is another example packet forwarding method in the present disclosure.

As shown in FIG. 8, the embodiments of the present disclosure provide a packet forwarding method 800. Execution subjects of the method may be a network card device and a virtual switch. The network card device may be composed of one or more network card components with network card functions. The network card device can also be a terminal device or server with network card functions. The virtual switch can be set in a terminal device or server, etc. The terminal device can be a device such as a personal computer, etc., or a mobile terminal device, such as a mobile phone, a tablet computer, etc. The server can be an independent server or a server cluster composed of multiple servers. Moreover, the server can be a back-end server of a certain service or a back-end server of a certain website (such as a shopping website or a payment application). This method can be used in processing such as performing hardware acceleration through a network card device in a process of packet forwarding.

In implementations, a scenario in which a physical network sends a packet to a virtual machine may be described. A virtual switch in implementations may be a Virtio-based virtual switch, etc. The method 800 may specifically include the following steps:

At step S802, a network card device obtains a first packet to be forwarded.

At step S804, the network card device obtains a first forwarding rule that matches the first packet according to information included in the first packet.

The contents of step S802 and step S804 are the same as those of step S602 and step S604. For details of processing process of step S802 and step S804, reference may be made to related contents of step S602 and step S604, which are not repeated herein.

At step S806, the network card device processes the first packet based on the first forwarding rule, and adds output port information to a predetermined field of metadata of the first packet to obtain a second packet.

The predetermined field may be a Userdata field of DpdkRte_Mbuf.

In implementations, in order to enable the network card device to smoothly forward the first packet to the target virtual machine, output port information corresponding to the first packet may be determined based on related information in the first packet. Metadata included in the first packet can then be obtained, and the determined output port information can be added to the metadata. In practical applications, the output port information can be added to a Userdata field of DPDK Rte_Mbuf, for example. Through the above processing, a second packet with the added output port information can be obtained.

At step S808, the network card device sends the second packet to a virtual switch.

In implementations, the first packet may be sent to the virtual switch based on VF.

At step S810, the virtual switch obtains a corresponding back-end processing program, VirtioBackend, according to the output port information.

Figure 9:
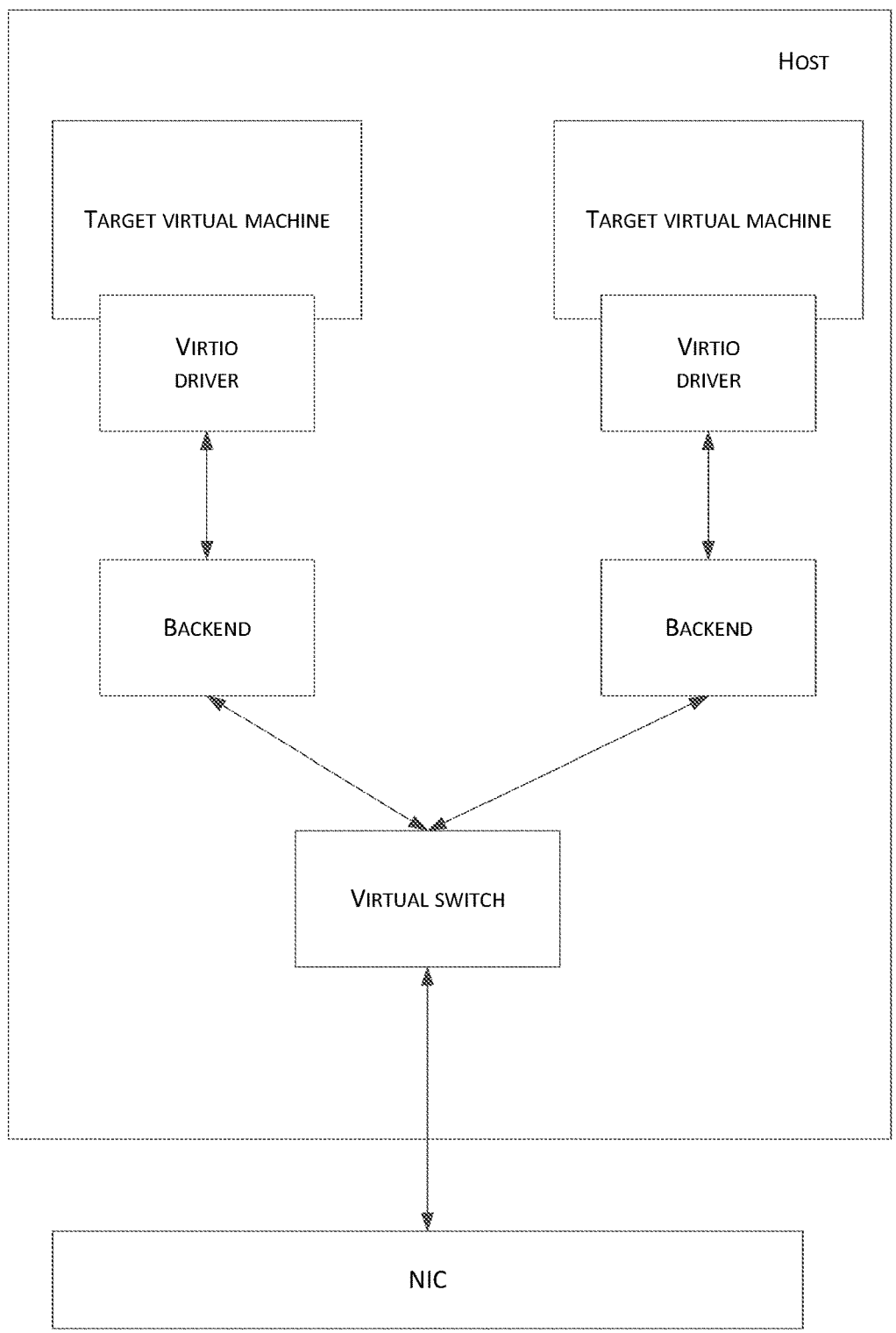
FIG. 9 is a schematic diagram of another packet forwarding system based on a Virtio-based virtual switch in the present disclosure.

In implementations, as shown in FIG. 9, a Virtio-based virtual switch can conduct front-end and back-end negotiations and communications with VirtoBackend through VirtioDriver (Virtio Driver), simulate a virtual network card through an application program or software, and provide network communications to a virtual machine. Therefore, after receiving the first packet, a virtual switch of the virtual machine can extract the output port information in the first packet, and can obtain a corresponding back-end processing program, VirtioBackend, through the output port information, so that the first packet can be sent to the target virtual machine.

At step S812, the second packet is forwarded to a target virtual machine based on the back-end processing program.

At step S814, if the first forwarding rule is not included in a forwarding rule list, the network card device adds input port information to the first packet to obtain a third packet.

In implementations, in an initial state, no forwarding rule exists in the network card device. After the first packet reaches the network card device, no matching forwarding rule can be found. Therefore, the network card device may send the packet to the virtual switch for processing.

The network card device can directly obtain a packet (i.e., the first packet). Subsequently, in order to enable the network card device to forward the first packet smoothly, input port information corresponding to the first packet can be determined based on relevant information in the first packet. Metadata included in the first packet can then be obtained, and the determined input port information can be added to the metadata. In practical applications, the input port information can be added to a Userdata field of DPDK Rte_Mbuf. Through the above processing, a third packet with the input port information can be obtained.

At step S816, the network card device marks the third packet as a matching failure packet, and sends the third packet to the virtual switch.

At step S818, the virtual switch sends the third packet to the target virtual machine according to the input port information, and sends the first forwarding rule to the network card device.

In implementations, the virtual switch can determine a matching field in the third packet that matches the input port information based on the input port information, obtain relevant information based on the determined matching field, and forward the third packet to the target virtual machine accordingly. In addition, the virtual switch may also generate a first forwarding rule that matches the information included in the third packet, and send the first forwarding rule to the network card device.

After receiving the first forwarding rule, the network card device may set the first forwarding rule as a forwarding rule that matches the information included in the first packet. After obtaining the first packet to be forwarded again, the network card device can forward the first packet based on the first forwarding rule, i.e., the processing of step S802 to step S812 as described above can be performed.

It should be noted that the virtual switch can complete operations such as Push Vxlan when the first forwarding rule is not included in the forwarding rule list. Vxlan (Virtual Extensible LAN) is a kind of Overlay network technology that uses a MAC in UDP method for perform encapsulation, which can include a 50-byte encapsulated packet header.

The packet forwarding method provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

Figure 10:
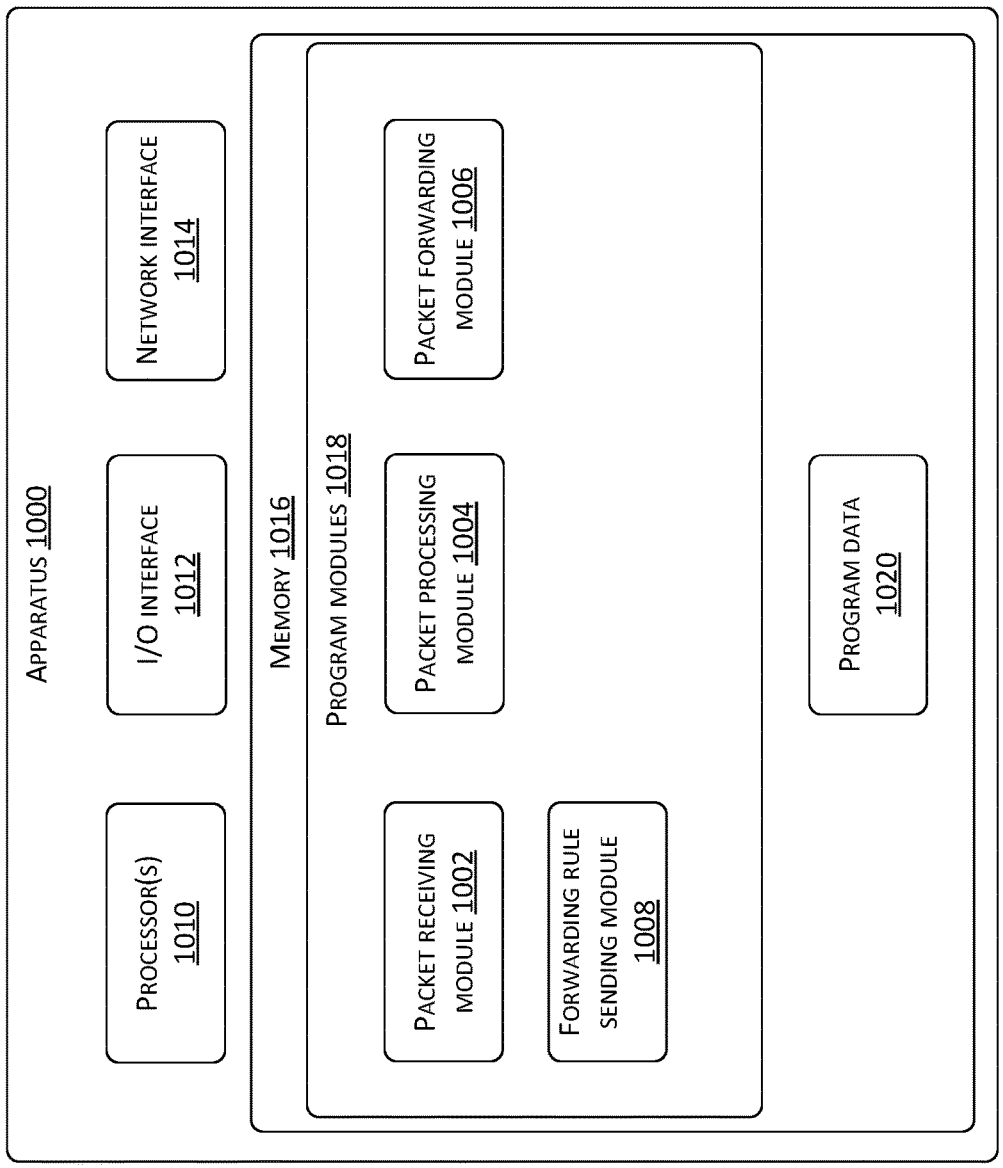
FIG. 10 is an example packet forwarding apparatus in the present disclosure.

The foregoing description refers to the packet forwarding methods provided in the present disclosure. In implementations, the embodiments of the present disclosure also provide a packet forwarding apparatus 1000, as shown in FIG. 10.

The packet forwarding apparatus 1000 may include: a packet receiving module 1002, a packet processing module 1004, and a packet forwarding module 1006, wherein:
the packet receiving module 1002 is configured to receive a first packet sent by a target virtual machine;
the packet processing module 1004 is configured to add input port information to the first packet to obtain a second packet; and
the packet forwarding module 1006 is configured to forward the second packet to a network card device, to cause the network card device to determine a corresponding first forwarding rule based on the input port information in response to receiving the second packet, and forward the second packet based on the first forwarding rule.

In implementations, the packet processing module 1004 is configured to add the input port information to the first packet, and set a hardware acceleration identification for the first packet to obtain the second packet.

In implementations, the packet processing module 1004 is configured to add the input port information to a predetermined field of metadata of the first packet.

In implementations, the predetermined field is a Userdata field of DpdkRte_Mbuf.

In implementations, the apparatus 1000 further includes:
a forwarding rule sending module 1008 configured to perform forwarding processing on the second packet in response to receiving the second packet marked as a matching failure packet from the network card device, and send the first forwarding rule to the network card device.

In implementations, the apparatus 1000 may further include one or more processors 1010, an input/output interface 1012, a network interface 1014, and memory 1016.

The memory 1016 may include a form of computer readable media such as a volatile memory, a random access memory (RAM) and/or a non-volatile memory, for example, a read-only memory (ROM) or a flash RAM. The memory 620 is example of a computer readable media. The memory 1016 may include one or more program modules 1018 and program data 1020.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The packet forwarding apparatus provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

Figure 11:
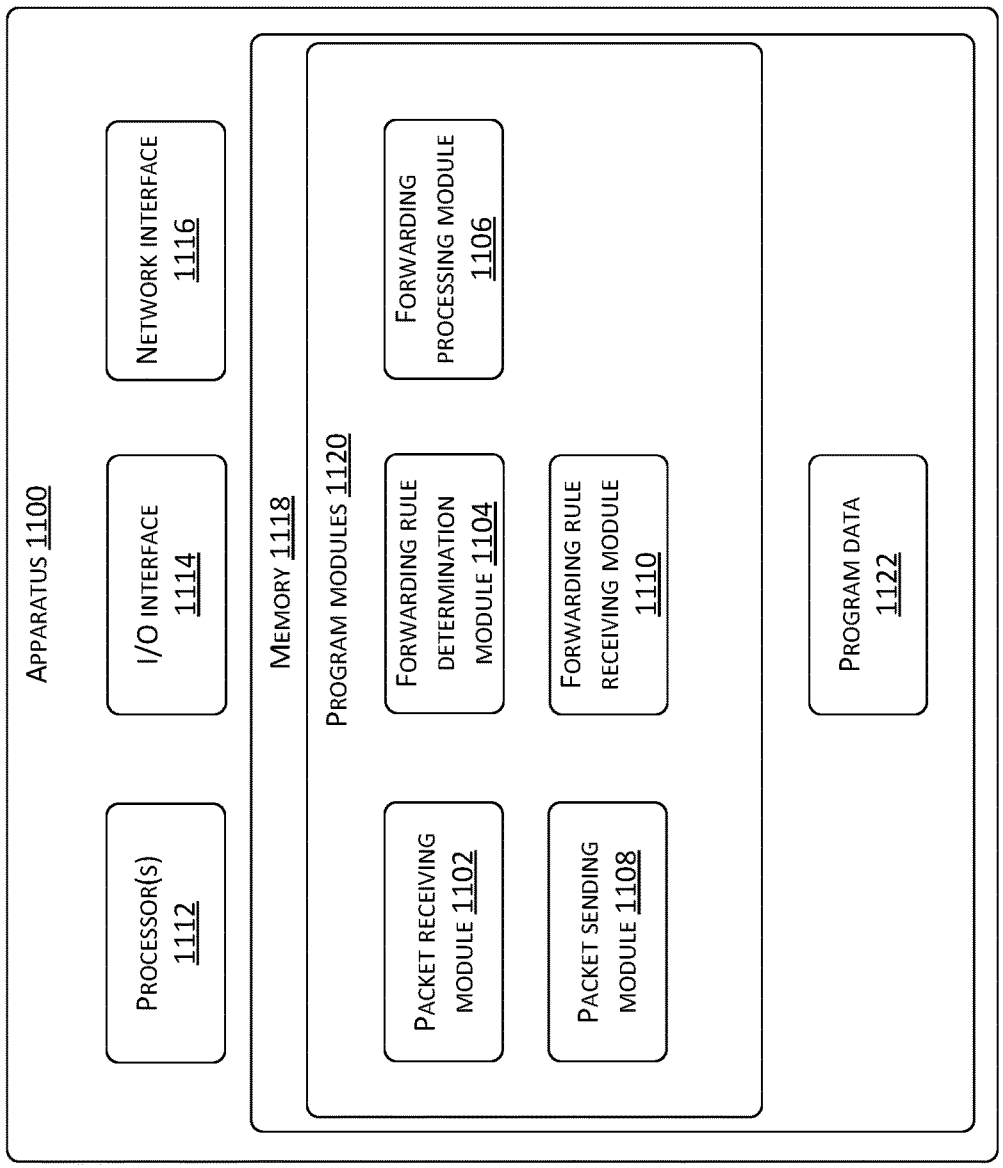
FIG. 11 is another example packet forwarding apparatus in the present disclosure.

In implementations, the embodiments of the present disclosure also provide a packet forwarding apparatus 1100, as shown in FIG. 11.

The packet forwarding apparatus 1100 may include: a packet receiving module 1102, a forwarding rule determination module 1104, and a forwarding processing module 1106, wherein:
 the packet receiving module 1102 is configured to receive a second packet sent by a virtual switch, the second packet being obtained after the virtual switch adds input port information to a first packet sent by a target virtual machine;
 the forwarding rule determination module 1104 is configured to determine a corresponding first forwarding rule based on the input port information; and
 the forwarding processing module 1106 is configured to forward the second packet based on the first forwarding rule.

In implementations, the forwarding rule determination module 1104 is configured to obtain a forwarding rule that matches the input port information and other information included in the second packet from a forwarding rule list, and determine the obtained forwarding rule as the first forwarding rule.

In implementations, the apparatus 1100 may further include:
 a packet sending module 1108 configured to mark the second packet as a matching failure packet, and send the first packet to the virtual switch to cause the virtual switch to perform forwarding processing on the second packet if the first forwarding rule is not matched; and
 a forwarding rule receiving module 1110 configured to receive the first forwarding rule sent by the virtual switch.

In implementations, the forwarding rule determination module 1104 is configured to determine the corresponding first forwarding rule based on the input port information if the second packet includes a hardware acceleration identification.

In implementations, the apparatus 1100 may further include one or more processors 1112, an input/output interface 1114, a network interface 1116, and memory 1118. The memory 1118 may include a form of computer readable media as described in the foregoing description. The memory 1118 may include one or more program modules 1120 and program data 1122.

The packet forwarding apparatus provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

Figure 12:
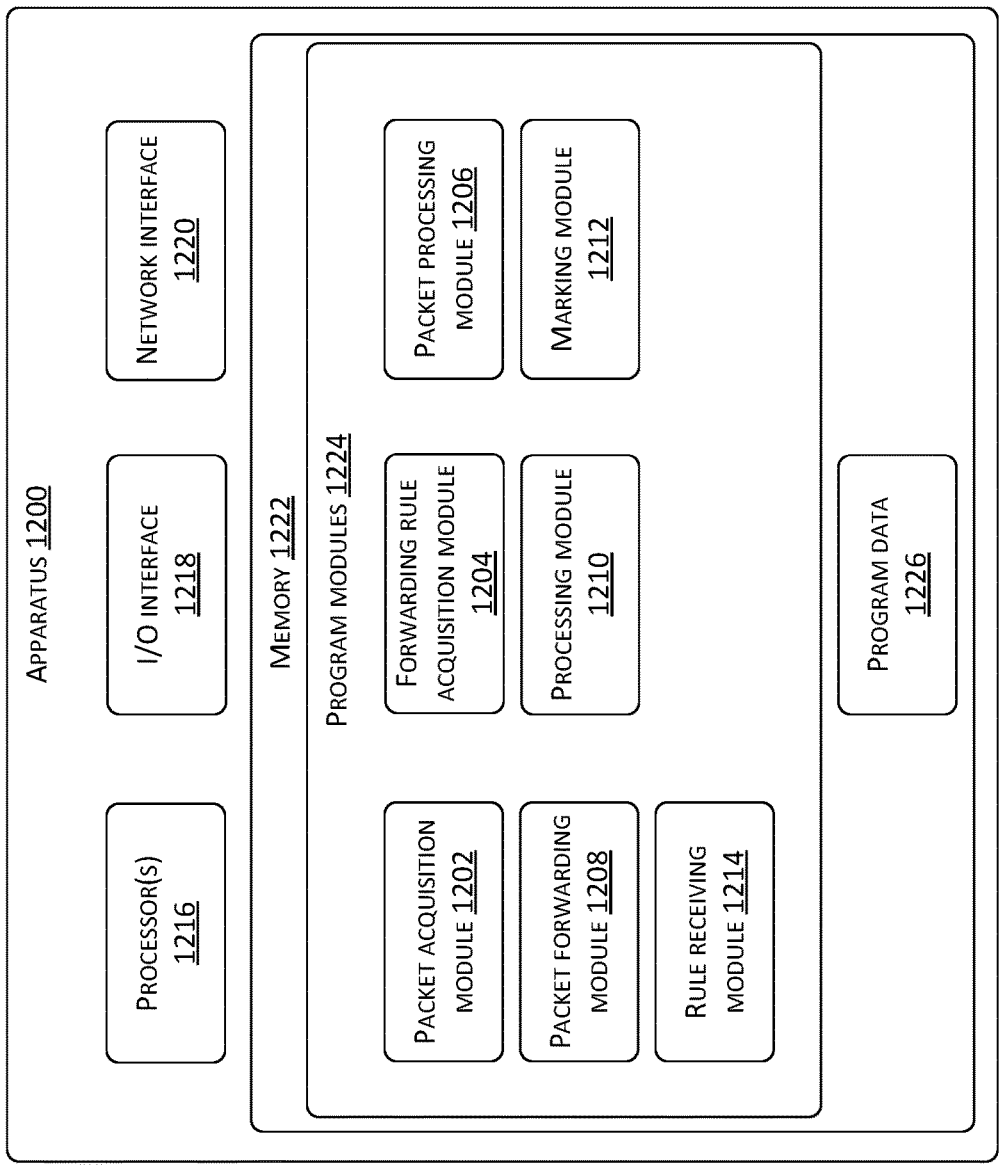
FIG. 12 is another example packet forwarding apparatus in the present disclosure.

In implementations, the embodiments of the present disclosure also provide a packet forwarding apparatus 1200, as shown in FIG. 12.

The packet forwarding apparatus 1200 may include: a packet acquisition module 1202, a forwarding rule acquisition module 1204, a packet processing module 1206, and a packet forwarding module 1208, wherein:
 the packet obtaining module 1202 is configured to obtain a first packet to be forwarded;
 the forwarding rule acquisition module 1204 is configured to obtain a first forwarding rule that matches the first packet according to information included in the first packet;
 the packet processing module 1206 is configured to process the first packet based on the first forwarding rule, and add output port information to the first packet to obtain a second packet; and
 the packet forwarding module 1208 is configured to forward the second packet to a virtual switch.

In implementations, the apparatus 1200 may further include:
 a processing module 1210 configured to add input port information to the first packet to obtain a third packet if the first forwarding rule is not matched; and
 a marking module 1212 configured to mark the third packet as a matching failure packet, and forward the third packet to the virtual switch.

In implementations, the apparatus 1200 may further include:
 a rule receiving module 1214 configured to receive the first forwarding rule sent by the virtual switch.

In implementations, the packet processing module 1206 is configured to add the output port information or the input port information to a predetermined field of metadata of the first packet.

In implementations, the predetermined field is a Userdata field of DpdkRte_Mbuf.

In implementations, the apparatus 1200 may further include one or more processors 1216, an input/output interface 1218, a network interface 1220, and memory 1222. The memory 1222 may include a form of computer readable media as described in the foregoing description. The memory 1222 may include one or more program modules 1224 and program data 1226.

The packet forwarding apparatus provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

Figure 13:
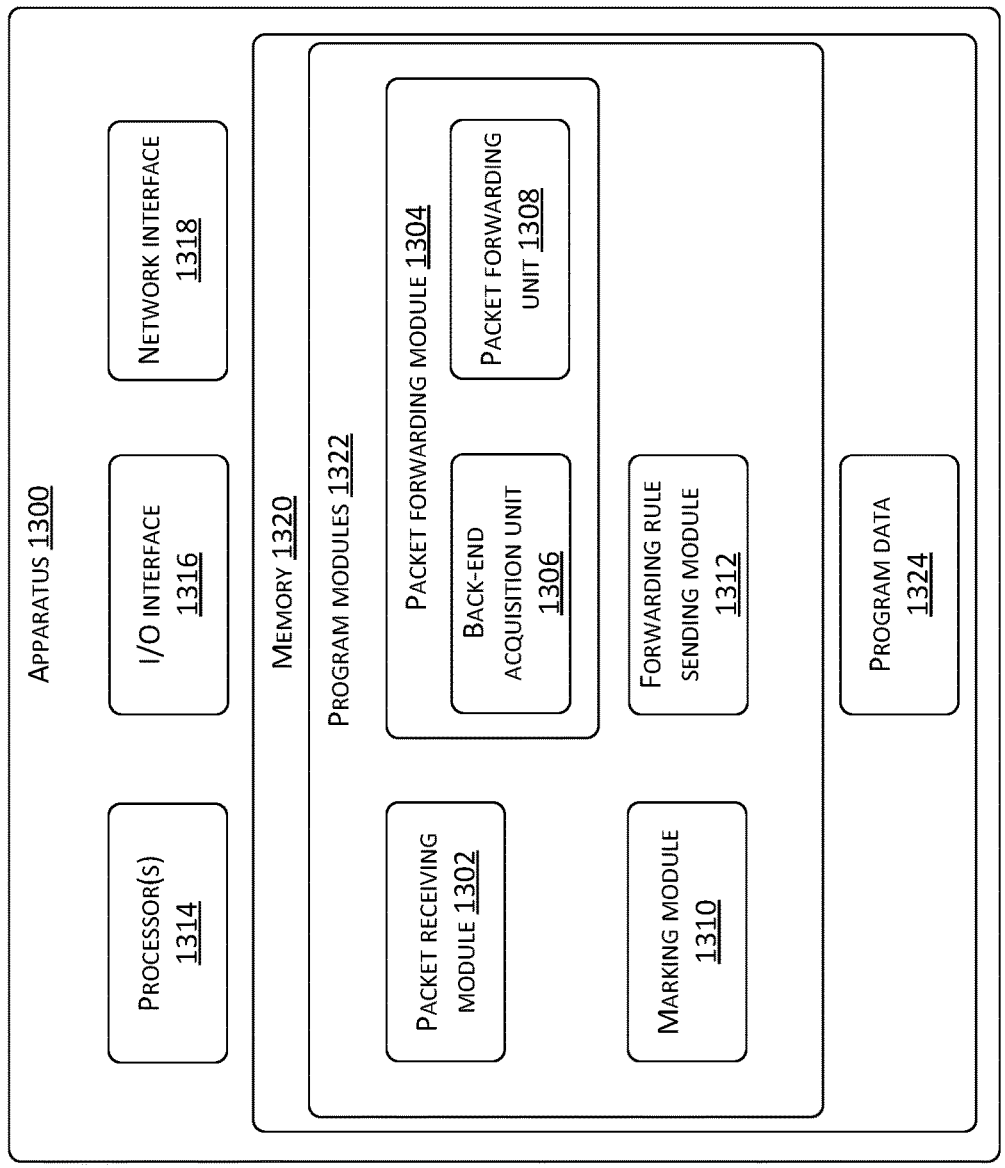
FIG. 13 is another example packet forwarding apparatus in the present disclosure.

In implementations, the embodiments of the present disclosure also provide a packet forwarding apparatus 1300, as shown in FIG. 13.

The packet forwarding apparatus 1300 may include: a packet receiving module 1302 and a packet forwarding module 1304, wherein:

the packet receiving module 1302 is configured to receive a second packet sent by a network card device, the second packet being obtained after the network card device processes an obtained first packet based on a first forwarding rule that matches the first packet, and adds output port information to the first packet; and the packet forwarding module 1304 is configured to forward the second packet to a target virtual machine according to the output port information.

In implementations, the packet forwarding module 1304 may include:

a back-end acquisition unit 1306 configured to obtain a corresponding back-end processing program according to the output port information; and a packet forwarding unit 1308 configured to forward the second packet to the target virtual machine based on the back-end processing program.

In implementations, the apparatus 1300 may further include:

a marking module 1310 configured to receive a third packet marked as a matching failure packet from the network card device, the third packet being obtained after the network card device adds input port information to the first packet; and a forwarding rule sending module 1312 configured to forward the third packet to the target virtual machine according to the input port information, and send the first forwarding rule to the network card device.

In implementations, the apparatus 1300 may further include one or more processors 1314, an input/output interface 1316, a network interface 1318, and memory 1320. The memory 1320 may include a form of computer readable media as described in the foregoing description. The memory 1320 may include one or more program modules 1322 and program data 1324.

The packet forwarding apparatus provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

Figure 14:
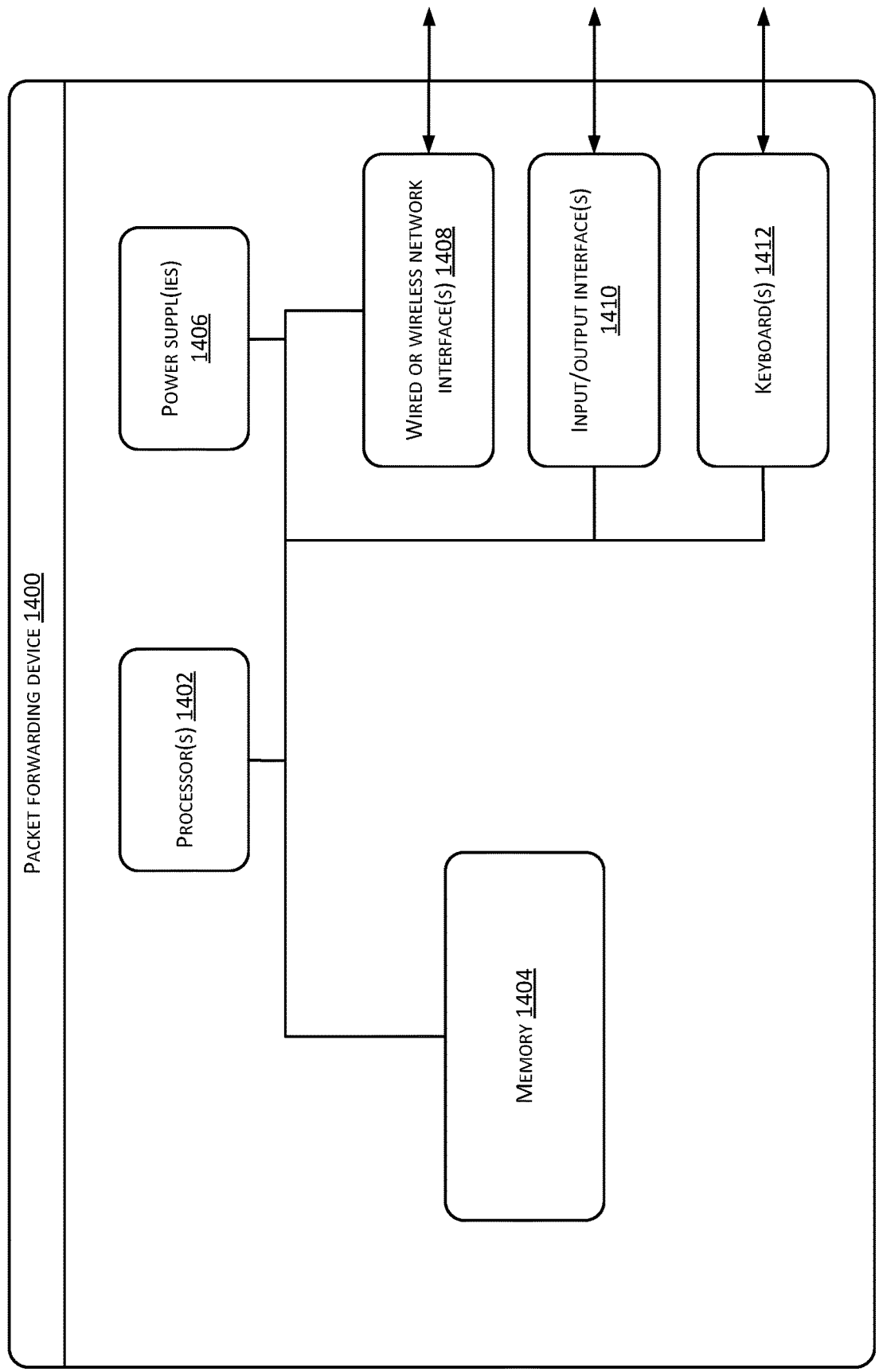
FIG. 14 is an example packet forwarding device in the present disclosure.

The foregoing refers to the packet forwarding apparatuses provided by the embodiments of the present disclosure. In implementations, the embodiments of the present disclosure also provide a packet forwarding device 1400, as shown in FIG. 14.

The packet forwarding device 1400 may be a network card device provided in the foregoing embodiments.

The packet forwarding device 1400 may have relatively large differences due to different configurations or performances, and may include one or more processors 1402 and a memory 1404. The memory 1404 may store one or more stored application programs or data. The memory 1404 may be a temporary storage or a persistent storage. The application programs stored in the memory 1404 may include one or more modules (not shown in the figure), and each module may include a series of computer-executable instructions in the packet forwarding device. Furthermore, the processors 1402 may be configured to communicate with the memory 1404, and execute a series of computer executable instructions in the memory 1404 on the packet forwarding device. The packet forwarding device may also include one or more power supplies 1406, one or more wired or wireless network interfaces 1408, one or more input and output interfaces 1410, and one or more keyboards 1412.

In implementations, the packet forwarding device includes a memory and one or more programs. The one or more programs are stored in the memory, and the one or more programs may include one or more modules. Each module may include a series of computer-executable instructions in the packet forwarding device. Furthermore, one or more processors are configured to execute the following computer-executable instructions included in the one or more programs to perform operations including:

receiving a first packet sent by a target virtual machine;

adding input port information to the first packet to obtain a second packet; and forwarding the second packet to a network card device, to cause the network card device to determine a corresponding first forwarding rule based on input port information in response to receiving the second packet, and perform forwarding processing on the second packet based on the first forwarding rule.

In implementations, adding the input port information to the first packet to obtain the second packet includes:

adding the input port information to the first packet, and setting a hardware acceleration identification for the first packet to obtain the second packet.

In implementations, adding the input port information to the first packet includes:

adding the input port information to a predetermined field of metadata of the first packet.

In implementations, the predetermined field is a Userdata field of DpdkRte_Mbuf.

In implementations, it also includes:

when the second packet marked as a matching failure packet is received from the network card device, performing forwarding processing on the second packet, and sending the first forwarding rule to the network card device.

In implementations, the packet forwarding device includes a memory and one or more programs. The one or more programs are stored in the memory, and the one or more programs may include one or more modules. Each module may include a series of computer-executable instructions in the packet forwarding device. Furthermore, one or more processors are configured to execute the following computer-executable instructions included in the one or more programs to perform operations including:

obtaining a first packet to be forwarded;
obtaining a first forwarding rule that matches the first packet according to information included in the first packet;
processing the first packet based on the first forwarding rule, and adding output port information to the first packet to obtain a second packet; and
forwarding the second packet to a virtual switch.

In implementations, after obtaining the first packet to be forwarded, it further includes:
if the first forwarding rule is not matched, adding input port information to the first packet to obtain a third packet; and
marking the third packet as a matching failure packet, and forwarding the third packet to the virtual switch.

In implementations, it further includes:
receiving the first forwarding rule sent by the virtual switch.

In the embodiments of the present specification, adding the output port information to the first packet includes:
adding the output port information or the input port information to a predetermined field of metadata of the first packet.

In implementations, the predetermined field is a Userdata field of DpdkRte_Mbuf.

The packet forwarding device provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

Figure 15:
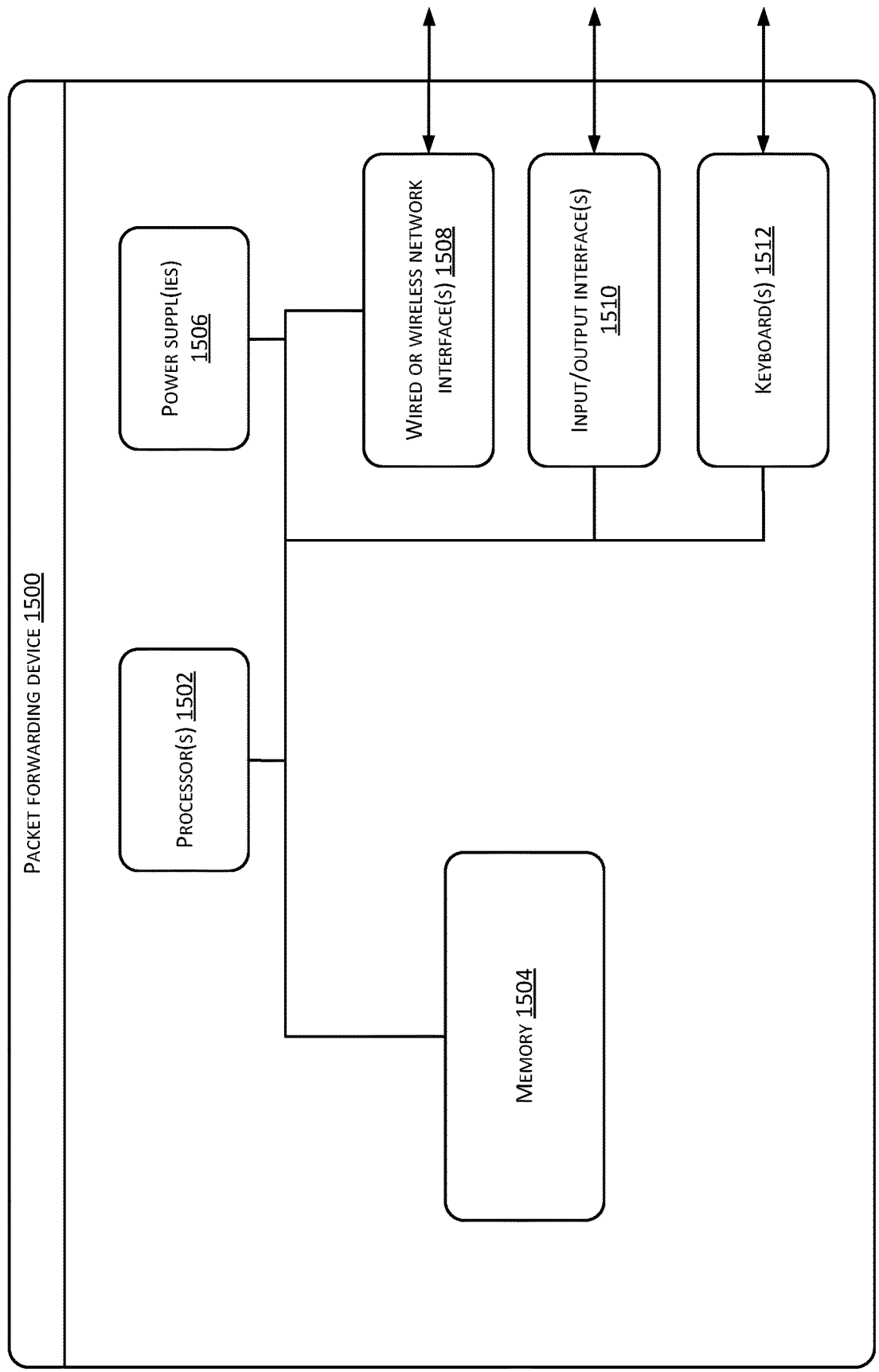
FIG. 15 is another example packet forwarding device in the present disclosure.

In implementations, the embodiments of the present disclosure also provide a packet forwarding device 1500, as shown in FIG. 15.

The packet forwarding device 1500 may be a virtual switch provided in the foregoing embodiments.

The packet forwarding device 1500 may have relatively large differences due to different configurations or performances, and may include one or more processors 1502 and a memory 1504. The memory 1504 may store one or more stored application programs or data. The memory 1504 may be a temporary storage or a persistent storage. The application programs stored in the memory 1504 may include one or more modules (not shown in the figure), and each module may include a series of computer-executable instructions in the packet forwarding device. Furthermore, the processors 1502 may be configured to communicate with the memory 1504, and execute a series of computer executable instructions in the memory 1504 on the packet forwarding device. The packet forwarding device may also include one or more power supplies 1506, one or more wired or wireless network interfaces 1508, one or more input and output interfaces 1510, and one or more keyboards 1512.

In implementations, the packet forwarding device includes a memory and one or more programs. The one or more programs are stored in the memory, and the one or more programs may include one or more modules. Each module may include a series of computer-executable instructions in the packet forwarding device. Furthermore, one or more processors are configured to execute the following computer-executable instructions included in the one or more programs to perform operations including:

receiving a second packet sent by the virtual switch, the second packet being obtained after a virtual switch adds input port information to a first packet sent by a target virtual machine;
determining a corresponding first forwarding rule based on the input port information; and
performing forwarding processing on the second packet based on the first forwarding rule.

In implementations, determining the corresponding first forwarding rule based on the input port information includes:
obtaining a forwarding rule matching the input port information and other information included in the second packet from a list of forwarding rules, and determining the obtained forwarding rule as the first forwarding rule.

In implementations, after receiving the second packet sent by the virtual switch, the operations further include:
the second packet as a matching failure packet if the first forwarding rule is not matched marking, and sending the first packet to the virtual switch, to cause the virtual switch to forward the second packet; and
receiving the first forwarding rule sent by the virtual switch.

In implementations, determining the corresponding first forwarding rule based on the input port information includes:
determining the corresponding first forwarding rule based on the input port information if the second packet contains a hardware acceleration identification.

In implementations, the packet forwarding device includes a memory and one or more programs. The one or more programs are stored in the memory, and the one or more programs may include one or more modules. Each module may include a series of computer-executable instructions in the packet forwarding device. Furthermore, one or more processors are configured to execute the following computer-executable instructions included in the one or more programs to perform operations including:

receiving a second packet sent by a network card device, the second packet being obtained after the network card device processes an obtained first packet based on a first forwarding rule that matches the first packet, and adds output port information to the first packet; and forwarding the second packet to a target virtual machine according to the output port information.

In implementations, forwarding the second packet to the target virtual machine according to the output port information includes:
obtaining a corresponding back-end processing program according to the output port information; and
forwarding the second packet to the target virtual machine based on the back-end processing program.

In implementations, the operations also include:
receiving a third packet marked as a matching failure packet from the network card device, the third packet being obtained after the network card device adds input port information to the first packet; and
forwarding the third packet to the target virtual machine according to the input port information, and sending the first forwarding rule to the network card device.

The packet forwarding device provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

In implementations, the embodiments of the present disclosure also provide a packet forwarding system, as shown in FIG. 5.

The system includes a target virtual machine, a virtual switch and a network card device, wherein:
the target virtual machine is configured to send a first packet to the virtual switch;
the virtual switch is configured to add input port information to the first packet to obtain a second packet after receiving the first packet sent by the target virtual machine, and forward the second packet to the network card device; and
the network card device is configured to determine a corresponding first forwarding rule based on the input port information included in the second packet in response to receiving the second packet sent by the virtual switch, and perform forwarding processing on the second packet based on the first forwarding rule.

In implementations, the virtual switch is further configured to set a hardware acceleration identification for the first packet; and
the network card device is configured to obtain the first forwarding rule that matches with the input port information and other information included in the second packet, in response to receiving the second packet sent by the virtual switch and determining that the second packet includes the hardware acceleration identification.

In implementations, the network card device is configured to obtain a forwarding rule that matches the input port information and other information included in the second packet from a forwarding rule list, and set the obtained forwarding rule as the first forwarding rule.

In implementations, the network card device is further configured to mark the second packet as a matching failure packet, and send the second packet to the virtual switch, if a matching for the first forwarding rule is not found; and
the virtual switch is further configured to perform forwarding processing of the second packet, and send the first forwarding rule to the network card device, after receiving the second packet that is marked as the matching failure packet sent by the network card device.

In implementations, the virtual switch is configured to add the input port information to a predetermined field of metadata of the first packet.

In implementations, the virtual switch is a Virtio-based virtual switch, and the target virtual machine is a Virtio-based virtual machine.

In implementations, the predetermined field is a Userdata field of DpdkRte_Mbuf.

Details of various processing processes of the target virtual machine, the virtual switch, and the network card device in the foregoing system can be referred to relevant contents in the example embodiments as described above, which are not repeated herein.

The packet forwarding system provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

In implementations, the embodiments of the present disclosure also provide a packet forwarding system, as shown in FIG. 9.

The system includes a target virtual machine, a virtual switch and a network card device, wherein:
the network card device is configured to obtain a first packet to be forwarded, and obtain a first forwarding rule matching the first packet according to information included in the first packet, and process the first packet based on the first forwarding rule, add output port information to the first packet to obtain a second packet, and forward the second packet to the virtual switch; and
the virtual switch is configured to obtain a corresponding back-end processing program according to the output port information after receiving the second packet sent by the network card device, and forward the second packet to the target virtual machine based on the back-end processing program.

In implementations, the network card device is further configured to add input port information to the first packet to obtain a third packet, mark the third packet to the packet as a matching failure packet, and forward the third packet to the virtual switch, if a matching for the first forwarding rule is not found;

the virtual switch is further configured to forward the third packet to the target virtual machine according to the input port information after receiving the third packet sent by the network card device, and send the first forwarding rule to the network card device.

In implementations, the network card device is configured to add the output port information or the input port information to a predetermined field of metadata of the first packet.

In implementations, the virtual switch is a Virtio-based virtual switch, and the target virtual machine is a Virtio-based virtual machine.

In implementations, the predetermined field is a predefined field and is a Userdata field of DpdkRte_Mbuf.

Details of various processing processes of the target virtual machine, the virtual switch, and the network card device in the foregoing system can be referred to relevant contents in the example embodiments as described above, which are not repeated herein.

The packet forwarding system provided by the embodiments of the present disclosure obtains a first packet to be forwarded, obtains a first forwarding rule matching information included in the first packet from a forwarding rule database according to the information included in the first packet, and forwards the first packet based on the first forwarding rule. As such, after the first packet reaches a network card device, the network card device will match and find a forwarding rule that is set in the network card device according to packet information of the first packet, and perform specific packet forwarding processing according to the first matching forwarding rule. The entire packet forwarding logic described above is completed by the network card device, and the virtual switch does not require resources, such as host CPU, etc., for processing. Moreover, there is no need to additionally install a corresponding driver in a virtual machine and maintain a version of the corresponding driver, thereby achieving high-performance packet forwarding.

The foregoing describes specific embodiments of the present disclosure. Other embodiments are within the scope of the appended claims. In some cases, actions or steps described in the claims may be performed in an order different from those in the embodiments, and can still achieve desired results. In addition, a process depicted in an accompanying drawing does not necessarily require a specific order or sequential order as shown to achieve a desired result. In some embodiments, multitasking and parallel processing are also possible or may be advantageous.

In the 1990s, a technical improvement may be clearly differentiated by hardware improvements (for example, improvements in circuit structures such as diodes, transistors, switches, etc.) or software improvements (improvements in method processes). However, with the development of technologies, many of today's method process improvements can be seen as a direct improvement in hardware circuit architectures. Designers may incorporate improved methods to hardware circuits to get the corresponding hardware circuit structures. Accordingly, a method of process improvement may be achieved with hardware entity modules. For example, a programmable logic device (Programmable Logic Device, PLD) (e.g., Field Programmable Gate Array, FPGA) is one such integrated circuit whose logic functions are determined through programming the device by a user. With a designer to program a digital system for "integrating" into a PLD on his/her own, it is not necessary to have a chip manufacturer to design and manufacture a dedicated integrated circuit chip. Further, by replacing manually produced integrated circuit chips, this type of programming is also mostly replaced by "logic compiler" software. Similar to a software compiler, such logic compiler compiles original codes written by a specific programming language, which is called a hardware description language (Hardware Description Language, HDL). HDL does not include only one type, and there are many kinds, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most common ones are VHDL (Very-High-Speed Integrated Circuit Hardware Description Language) and Verilog. One skilled in the art should understand that a hardware circuit implementing the logic method flow may be easily achieved by performing a little logic programming and compiling these methods into an integrated circuit using hardware description language.

A controller can be implemented in any suitable manner. For example, a controller can take a form of, for example, a microprocessor or processor, and computer readable media, logic gates, switches, application specific integrated circuits (ASICs), programmable logic controllers, and embedded microcontrollers, that store computer readable program codes (e.g., software or firmware) executable by the microprocessor or processor. Examples of a controller include, but are not limited to, the following microcontrollers: ARC 625D, Atmel AT91SAM, The Microchip PIC18F26K20 and Silicone Labs C8051F320. A memory controller can also be implemented as a part of control logic of a memory. In addition to implementing a controller in a form of purely computer readable program codes, one skilled in the art should also understand that the method steps can be logically programmed to cause a controller in a form of logic gates, switches, ASICs, programmable logic controllers, and embedded microcontrollers, etc., to implement the same functions. Such type of controller can therefore be considered as a hardware component, and an apparatus used for implementing various functions included therein can also be considered as a structure within the hardware component. Or even an apparatus used for implementing various functions can be considered as both software module(s) implementing a method and a structure within a hardware component.

The systems, apparatuses, modules or units illustrated in the above embodiments may be implemented by a computer chip or an entity, or by a product having certain functions. A device of a typical implementation is a computer, and a specific form of the computer may be a personal computer, a laptop computer, a cellular phone, a camera phone, a smart phone, a personal digital assistant, a media player, a navigation device, an email transceiver, and a game control, a tablet computer, a wearable device, or any combination of a number of these devices.

For the convenience of description, the above apparatuses are divided into various units in terms of functionalities respectively during description. Apparently, function(s) of each unit may be implemented in the same piece of software or multiple pieces of software and/or hardware when one or more embodiments of the present disclosure are implemented.

One skilled in the art should understand that the embodiments of the present disclosure can be provided as a method, a system, or a computer program product. Accordingly, one or more embodiments of the present disclosure may take a form of an entirely hardware embodiment, an entirely software embodiment, or a combination of software and hardware. Moreover, one or more embodiments of the present disclosure can take a form of a computer program product embodied on one or more computer-usable storage media (including but not limited to a magnetic disk storage device, a CD-ROM, an optical storage device, etc.) that include computer usable program codes.

The embodiments of the present disclosure are described with reference to flowcharts and/or block diagrams of methods, apparatus (system), and computer program products with reference to and according to the embodiments of the present disclosure. It should be understood that each process and/or block of the flowcharts and/or block diagrams, and combinations of processes and/or blocks of the flowcharts and/or block diagrams are implemented by computer program instructions. These computer program instructions can be provided to a general purpose computer, a special purpose computer, an embedded processor, or other programmable data processing device to produce a machine, to cause an execution of the instructions by a processor of a computer or other programmable data processing device to produce an apparatus used for implementing functions specified in one or more processes in the flowcharts and/or one or more blocks of the block diagrams.

These computer program instructions can also be stored in a computer readable storage device that can direct a computer or other programmable data processing device to operate in a specific way, such that the instructions stored in the computer readable storage device produce an article of manufacture including an instruction apparatus. The instruction apparatus implements functions specified in one or more processes in the flowcharts and/or one or more blocks of the block diagrams.

These computer program instructions can also be loaded onto a computer or other programmable data processing device, such that a series of operational steps are performed on a computer or other programmable device to produce computer-implemented processing, thereby the instructions that are executed on a computer or other programmable device provide steps for implementing functions one or more processes in the flowcharts and/or one or more blocks of the block diagrams.

In a typical configuration, a computing device includes one or more processors (CPUs), an input/output interface, a network interface, and memory.

The memory may include a form of computer readable media such as a volatile memory, a random access memory (RAM) and/or a non-volatile memory, for example, a read-only memory (ROM) or a flash RAM. The memory is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

It also needs to be noted that terms "containing", "consisting of" or any other variations are intended to encompass a non-exclusive inclusion, such that a process, method, article, or device including a series of elements includes not only these elements, but also other elements that are not explicitly listed, or elements that are inherent to such process, method, article, or device. Without further limitation, an element defined by a phrase "comprising a . . . " does not exclude a presence of additional equivalent elements in the process, method, article, or device including that element.

One skilled in the art should understand that the embodiments of the present disclosure can be provided as a method, system, or a computer program product. Thus, one or more embodiments of the present disclosure can take a form of an entirely hardware embodiment, an entirely software embodiment or an embodiment of a combination of software and hardware. Moreover, one or more embodiments of the present disclosure can take a form of a computer program product embodied on one or more computer-usable storage media (including but not limited to a magnetic disk storage device, a CD-ROM, an optical storage device, etc.) that include computer usable program codes.

One or more embodiments of the present disclosure can be described in the general context of computer-executable instructions executed by a computer, such as a program module. Generally, program modules include routines, programs, objects, components, data structures, etc., that perform particular tasks or implement particular abstract data types. One or more embodiments of the present disclosure can also be practiced in distributed computing environments. In these distributed computing environments, tasks are performed by remote processing devices that are connected through a communication network. In a distributed computing environment, program modules can be located in both local and remote computer storage media including storage devices.

Various embodiments in the present disclosure are described in a progressive manner. Same or similar parts between the various embodiments may be referenced to each other. Each embodiment puts an emphasis on an aspect that is different from those of other embodiments. In particular, due to their basic similarities to the method embodiments, the description of system embodiments is relatively simple. Relevant parts can be referred to the description of the method embodiments.

The foregoing describes the embodiments of the present disclosure only, and is not intended to limit the present disclosure. Various changes and modifications can be made to the present disclosure by one skilled in the art. Any modifications, equivalents, improvements, etc., that are made within the spirit and scope of the present disclosure are intended to be included within the scope of the claims of the present disclosure.

The present disclosure can further be understood using the following clauses.

Clause 1: A packet forwarding system, the system comprising: a target virtual machine, a virtual switch and a network card device, wherein: the target virtual machine is configured to send a first packet to the virtual switch; the virtual switch is configured to add input port information to the first packet to obtain a second packet after receiving the first packet sent by the target virtual machine, and forward the second packet to the network card device; and the network card device is configured to determine a corresponding first forwarding rule based on the input port information included in the second packet in response to receiving the second packet sent by the virtual switch, and perform forwarding processing on the second packet based on the first forwarding rule.

Clause 2: The system as recited in Clause 1, wherein: the virtual switch is further configured to set a hardware acceleration identification for the first packet; and the network card device is configured to obtain the first forwarding rule that matches with the input port information and other information included in the second packet, in response to receiving the second packet sent by the virtual switch and determining that the second packet includes the hardware acceleration identification.

Clause 3: The system as recited in Clause 2, wherein the network card device is configured to obtain a forwarding rule that matches the input port information and other information included in the second packet from a forwarding rule list, and set the obtained forwarding rule as the first forwarding rule.

Clause 4: The system as recited in Clause 1, wherein: the network card device is further configured to mark the second packet as a matching failure packet, and send the second packet to the virtual switch, if a matching for the first forwarding rule is not found; and the virtual switch is further configured to perform forwarding processing of the second packet, and send the first forwarding rule to the network card device, after receiving the second packet that is marked as the matching failure packet sent by the network card device.

Clause 5: The system as recited in Clause 1, wherein the virtual switch is configured to add the input port information to a predetermined field of metadata of the first packet.

Clause 6: The system as recited in any one of Clauses 1-5, wherein the virtual switch is a Virtio-based virtual switch, and the target virtual machine is a Virtio-based virtual machine.

Clause 7: The system as recited in Clause 6, wherein the predetermined field is a Userdata field of DpdkRte_Mbuf.

Clause 8: A packet forwarding system, the system comprising: a target virtual machine, a virtual switch and a network card device, wherein: the network card device is configured to obtain a first packet to be forwarded, and obtain a first forwarding rule matching the first packet according to information included in the first packet, and process the first packet based on the first forwarding rule, add output port information to the first packet to obtain a second packet, and forward the second packet to the virtual switch; and the virtual switch is configured to obtain a corresponding back-end processing program according to the output port information after receiving the second packet sent by the network card device, and forward the second packet to the target virtual machine based on the back-end processing program.

Clause 9: The system as recited in Clause 8, wherein: the network card device is further configured to add input port information to the first packet to obtain a third packet, mark the third packet to the packet as a matching failure packet, and forward the third packet to the virtual switch, if a matching for the first forwarding rule is not found; and the virtual switch is further configured to forward the third packet to the target virtual machine according to the input port information after receiving the third packet sent by the network card device, and send the first forwarding rule to the network card device.

Clause 10: The system as recited in Clause 9, wherein the network card device is configured to add the output port information or the input port information to a predetermined field of metadata of the first packet.

Clause 11: The system as recited in any one of Clauses 8-10, wherein the virtual switch is a Virtio-based virtual switch, and the target virtual machine is a Virtio-based virtual machine.

Clause 12: The system as recited in Clause 11, wherein the predetermined field is a predefined field and is a Userdata field of DpdkRte_Mbuf.

Clause 13: A packet forwarding method, the method comprising: receiving a first packet sent by a target virtual machine; adding input port information to the first packet to obtain a second packet; and forwarding the second packet to a network card device, to cause the network card device to determine a corresponding first forwarding rule based on the input port information in response to receiving the second packet, and perform forwarding processing on the second packet based on the first forwarding rule.

Clause 14: The method as recited in Clause 13, wherein adding the input port information to the first packet to obtain the second packet comprises: adding the input port information to the first packet, and setting a hardware acceleration identification for the first packet to obtain the second packet.

Clause 15: The method as recited in Clause 13, wherein adding the input port information to the first packet comprises: adding the input port information to a predetermined field of metadata of the first packet.

Clause 16: The method as recited in Clause 15, wherein the predetermined field is a Userdata field of DpdkRte_Mbuf.

Clause 17: The method as recited in Clause 13, wherein the method further comprises: performing forwarding processing on the second packet in response to receiving the second packet that is marked as a matching failure packet sent by the network card device, and sending the first forwarding rule to the network card device.

Clause 18: A packet forwarding method, the method comprising: receiving a second packet sent by a virtual switch, the second packet being obtained after the virtual switch adds input port information to a first packet that is sent by a target virtual machine; determining a corresponding first forwarding rule based on the input port information; and performing forwarding processing on the second packet based on the first forwarding rule.

Clause 19: The method as recited in Clause 18, wherein determining the corresponding first forwarding rule based on the input port information comprises: obtaining a forwarding rule matching the input port information and other information included in the second packet from a list of forwarding rules, and setting the obtained forwarding rule as the first forwarding rule.

Clause 20: The method as recited in Clause 18, wherein: after receiving the second packet sent by the virtual switch, the method further comprises: marking the second packet as a matching failure packet if a matching for the first forwarding rule is not found, and sending the first packet to the virtual switch, to cause the virtual switch to perform forwarding processing the second packet; and receiving the first forwarding rule sent by the virtual switch.

Clause 21: The method as recited in Clause 18, wherein determining the corresponding first forwarding rule based on the input port information comprises: determining the corresponding first forwarding rule based on the input port information if the second packet includes a hardware acceleration identification.

Clause 22: A packet forwarding method, the method comprising: obtaining a first packet to be forwarded; obtaining a first forwarding rule that matches the first packet according to information included in the first packet; processing the first packet based on the first forwarding rule, and adding output port information to the first packet to obtain a second packet; and forwarding the second packet to the virtual switch.

Clause 23: The method as recited in Clause 22, wherein: after obtaining the first packet to be forwarded, the method further comprises: adding input port information to the first packet to obtain a third packet if a matching for the first forwarding rule is not found; marking the third packet as a matching failure packet, and forwarding the third packet to the virtual switch.

Clause 24: The method as recited in Clause 23, wherein the method further comprises: receiving the first forwarding rule sent by the virtual switch.

Clause 25: The method as recited in Clause 22, wherein adding the output port information to the first packet comprises: adding the output port information or the input port information to a predetermined field of metadata of the first packet.

Clause 26: The method as recited in Clause 25, wherein the predetermined field is a Userdata field of DpdkRte_Mbuf.

Clause 27: A packet forwarding method, the method comprising: receiving a second packet sent by a network card device, the second packet being obtained after the network card device processes an obtained first packet based on a first forwarding rule that matches the first packet, and adds output port information to the first packet; and forwarding the second packet to a target virtual machine according to the output port information.

Clause 28: The method as recited in Clause 27, wherein forwarding the second packet to the target virtual machine according to the output port information comprises: obtaining a corresponding back-end processing program according to the output port information; and forwarding the second packet to the target virtual machine based on the back-end processing program.

Clause 29: The method as recited in Clause 27, wherein the method further comprises: receiving a third packet that is marked as a matching failure packet sent by the network card device, the third packet being obtained after the network card device adds input port information to the first packet; and forwarding the third packet to the target virtual machine according to the input port information, and sending the first forwarding rule to the network card device.

Clause 30: A packet forwarding apparatus, the apparatus comprising: a packet receiving module configured to receive a first packet sent by a target virtual machine; a packet processing module configured to add input port information to the first packet to obtain a second packet; and a packet forwarding module configured to forward the second packet to a network card device, to cause the network card device to determine a corresponding first forwarding rule based on the input port information in response to receiving the second packet, and perform forwarding processing on the second packet based on the first forwarding rule.

Clause 31: A packet forwarding apparatus, the apparatus comprising: a packet receiving module configured to receive a second packet sent by a virtual switch, the second packet being obtained by the virtual switch by adding input port information to a first packet that is sent by a target virtual machine; a forwarding rule determination module configured to determine a corresponding first forwarding rule based on the input port information; and a forwarding processing module configured to perform forwarding processing on the second packet based on the first forwarding rule.

Clause 32: A packet forwarding apparatus, the apparatus comprising: a packet acquisition module configured to obtain a first packet to be forwarded; a forwarding rule acquisition module configured to acquire a first forwarding rule matching the first packet according to information included in the first packet; a packet processing module configured to process the first packet based on the first forwarding rule, and add output port information to the first packet to obtain a second packet; and a packet forwarding module configured to forward the second packet to a virtual switch.

Clause 33: A packet forwarding apparatus, the apparatus comprising: a packet receiving module configured to receive a second packet sent by a network card device, the second packet being obtained after the network card device processes an obtained first packet based on a first forwarding rule that matches the first packet, and adds output port information to the first packet; and a packet forwarding module configured to forward the second packet to a target virtual machine according to the output port information.

Clause 34: A packet forwarding device, the device comprising: a processor; and a memory adapted to store computer-executable instructions that, when executed, cause the processor to: receive a first packet sent by a target virtual machine; add input port information to the first packet to obtain a second packet; and forward the second packet to a network card device, to cause the network card device to determine a corresponding first forwarding rule based on the input port information in response to receiving the second packet, and perform forwarding processing on the second packet based on the first forwarding rule.

Clause 35: A packet forwarding device, the device comprising: a processor; and a memory adapted to store computer-executable instructions that, when executed, cause the processor to: receive a second packet sent by a virtual switch, where the second packet is obtained after a virtual switch adds input port information to a first packet sent by a target virtual machine; determine a corresponding first forwarding rule based on the input port information; and perform forwarding processing on the second packet based on the first forwarding rule.

Clause 36: A packet forwarding device, the device comprising: a processor; and a memory adapted to store computer-executable instructions that, when executed, cause the processor to: obtain a first packet to be forwarded; obtain a first forwarding rule that matches the first packet according to information included in the first packet; process the first packet based on the first forwarding rule, and add output port information to the first packet to obtain a second packet; and forward the second packet to a virtual switch.

Clause 37: A packet forwarding device, the device comprising: a processor; and a memory adapted to store computer-executable instructions that, when executed, cause the processor to: receive a second packet sent by a network card device, the second packet being obtained after the network card device processes an obtained first packet based on a first forwarding rule that matches the first packet, and adds output port information to the first packet; and forward the second packet to a target virtual machine according to the output port information.

What is claimed is:

1. A method implemented by a computing device, the method comprising:
    receiving a first packet sent by a target virtual machine;
    adding input port information to the first packet to obtain a second packet; and
    forwarding the second packet to a network card device, to cause the network card device to: determine a corresponding first forwarding rule based on the input port information, and perform forwarding processing on the second packet based on the first forwarding rule; and
    receiving the second packet from the network card device after the second packet is forwarded to the network card device, wherein the second packet is marked as a matching failure packet when failing to obtain a forwarding rule matching the input port information and other information included in the second packet from a list of forwarding rules.

2. The method as recited in claim 1, wherein adding the input port information to the first packet to obtain the second packet comprises:
    adding the input port information to the first packet, and setting a hardware acceleration identification for the first packet to obtain the second packet.

3. The method as recited in claim 1, wherein adding the input port information to the first packet comprises:
    adding the input port information to a predetermined field of metadata of the first packet.

4. The method as recited in claim 3, wherein the predetermined field comprises a Userdata field of DpdkRte_Mbuf.

5. The method as recited in claim 1, further comprising:
    performing forwarding processing on the second packet after receiving the second packet marked as the matching failure packet from the network card device; and
    sending the first forwarding rule to the network card device.

6. One or more computer readable media storing executable instructions that, when executed by one or more processors, cause the one or more processors to perform acts comprising:
    receiving a second packet from a virtual switch, the second packet being obtained after the virtual switch adds input port information to a first packet that is sent by a target virtual machine;
    determining a corresponding first forwarding rule based on the input port information; and
    performing forwarding processing on the second packet based on the first forwarding rule, wherein the acts further comprise marking the second packet as a matching failure packet in response to failing to obtain a forwarding rule matching the input port information and other information included in the second packet from a list of forwarding rules.

7. The one or more computer readable media as recited in claim 6, wherein determining the corresponding first forwarding rule based on the input port information comprises:
    searching for the forwarding rule matching the input port information and other information included in the second packet from the list of forwarding rules.

8. The one or more computer readable media as recited in claim 7, wherein determining the corresponding first forwarding rule based on the input port information further comprises:
    obtaining the forwarding rule matching the input port information and other information included in the second packet from the list of forwarding rules; and
    setting the obtained forwarding rule as the first forwarding rule.

9. The one or more computer readable media as recited in claim 7, wherein determining the corresponding first forwarding rule based on the input port information further comprises:
    failing to obtain the forwarding rule matching the input port information and other information included in the second packet from the list of forwarding rules.

10. The one or more computer readable media as recited in claim 9, further comprising: sending the first packet to the virtual switch, to cause the virtual switch to perform forwarding processing the second packet; and receiving the first forwarding rule sent by the virtual switch.

11. The one or more computer readable media as recited in claim 7, wherein determining the corresponding first forwarding rule based on the input port information comprises:
    determining the corresponding first forwarding rule based on the input port information if the second packet includes a hardware acceleration identification.

12. The one or more computer readable media as recited in claim 7, wherein determining the corresponding first forwarding rule based on the input port information comprises:
    determining the corresponding first forwarding rule based on the input port information if the input port information is included in a predetermined field of metadata of the second packet.

13. An apparatus comprising:
    one or more processors; and
    memory storing executable instructions that, when executed by one or more processors, cause the one or more processors to perform acts comprising:
        obtaining a first packet to be forwarded;
        obtaining a first forwarding rule that matches the first packet according to information included in the first packet;
        processing the first packet based on the first forwarding rule, and adding output port information to the first packet to obtain a second packet; and
        forwarding the second packet to the virtual switch, wherein the acts further comprise adding input port information to the first packet to obtain a third packet if a matching for the first forwarding rule is not found.

14. The apparatus as recited in claim 13, the acts further comprising:
    marking the third packet as a matching failure packet; and
    forwarding the third packet to the virtual switch.

15. The apparatus as recited in claim 14, the acts further comprising:
    receiving the first forwarding rule from the virtual switch.

16. The apparatus as recited in claim 13, wherein adding the output port information to the first packet comprises:
    adding the output port information or the input port information to a predetermined field of metadata of the first packet.

17. The apparatus as recited in claim 16, wherein the predetermined field comprises a Userdata field of DpdkRte_Mbuf.

* * * * *